US011045728B2

(12) United States Patent
Gohara

(10) Patent No.: US 11,045,728 B2
(45) Date of Patent: Jun. 29, 2021

(54) GAME SYSTEM, NON-TRANSITORY STORAGE MEDIUM HAVING STORED THEREIN GAME PROGRAM, INFORMATION PROCESSING APPARATUS, AND GAME CONTROL METHOD

(71) Applicant: NINTENDO CO., LTD., Kyoto (JP)

(72) Inventor: Shigetoshi Gohara, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 268 days.

(21) Appl. No.: 15/725,601

(22) Filed: Oct. 5, 2017

(65) Prior Publication Data

US 2018/0193737 A1    Jul. 12, 2018

(30) Foreign Application Priority Data

Jan. 6, 2017  (JP) .............................. JP2017-001341

(51) Int. Cl.
*A63F 13/285*  (2014.01)
*A63F 13/2145*  (2014.01)
(Continued)

(52) U.S. Cl.
CPC ........ *A63F 13/285* (2014.09); *A63F 13/2145* (2014.09); *A63F 13/24* (2014.09);
(Continued)

(58) Field of Classification Search
CPC ......... A63F 13/06; A63F 13/10; A63F 13/285
See application file for complete search history.

(56) References Cited

U.S. PATENT DOCUMENTS 6,283,859 B1 * 9/2001 Carlson .................. B62D 5/006
    188/267.1
6,645,076 B1 * 11/2003 Sugai ...................... A63F 13/10
    463/30
(Continued)

FOREIGN PATENT DOCUMENTS

JP        04-232829      8/1992
JP        09-122354      5/1997
(Continued)

OTHER PUBLICATIONS

Office Action dated Jul. 1, 2019 in Japanese Application No. 2017-001341, 3 pages.
(Continued)

*Primary Examiner* — James S. McClellan
(74) *Attorney, Agent, or Firm* — Nixon & Vanderhye PC

(57) ABSTRACT

A game system includes: a controller; a vibration actuator configured to vibrate with a specified intensity; a player character control unit configured to move a player character within a virtual space on the basis of operation onto the controller; and a vibration control unit configured to determine a contact between the player character and an uninvadable obstacle object, and configured to cause the vibration actuator to vibrate with an intensity corresponding to a traveling direction of the player character with respect to the obstacle object in a case where the operation onto the controller is operation of directing the player character toward the obstacle object. The vibration control unit includes a vibration intensity calculation unit configured to calculate the intensity of vibration and a vibration data generator configured to generate vibration data on the basis of the calculated intensity of vibration.

20 Claims, 17 Drawing Sheets

(51) Int. Cl.
  *A63F 13/30* (2014.01)
  *A63F 13/50* (2014.01)
  *A63F 13/24* (2014.01)
  *A63F 13/25* (2014.01)
  *A63F 13/573* (2014.01)
  *A63F 13/577* (2014.01)
  *A63F 13/92* (2014.01)

(52) U.S. Cl.
  CPC .............. *A63F 13/25* (2014.09); *A63F 13/30* (2014.09); *A63F 13/50* (2014.09); *A63F 13/573* (2014.09); *A63F 13/577* (2014.09); *A63F 13/92* (2014.09)

(56) References Cited

U.S. PATENT DOCUMENTS

| 2002/0105229 | A1* | 8/2002 | Tanaka | A63F 13/06 |
| | | | | 307/29 |
| 2008/0094351 | A1 | 4/2008 | Nogami et al. | |
| 2014/0232534 | A1* | 8/2014 | Birnbaum | G06F 3/016 |
| | | | | 340/407.1 |
| 2014/0300562 | A1 | 10/2014 | Tanaka et al. | |

FOREIGN PATENT DOCUMENTS

| JP | 11-33229 | 2/1999 |
| JP | 2002-529846 | 9/2002 |
| JP | 2008-000345 | 1/2008 |
| JP | 2008/134990 | 6/2008 |
| JP | 2009-189527 | 8/2009 |
| JP | 2012-011220 | 1/2012 |
| JP | 2014-216026 | 11/2014 |
| WO | 00/28405 | 5/2000 |
| WO | 2013/051662 | 4/2013 |

OTHER PUBLICATIONS

Office Action dated Jan. 28, 2020 in corresponding Japanese Application No. 2017-001341, 5 pages.

* cited by examiner

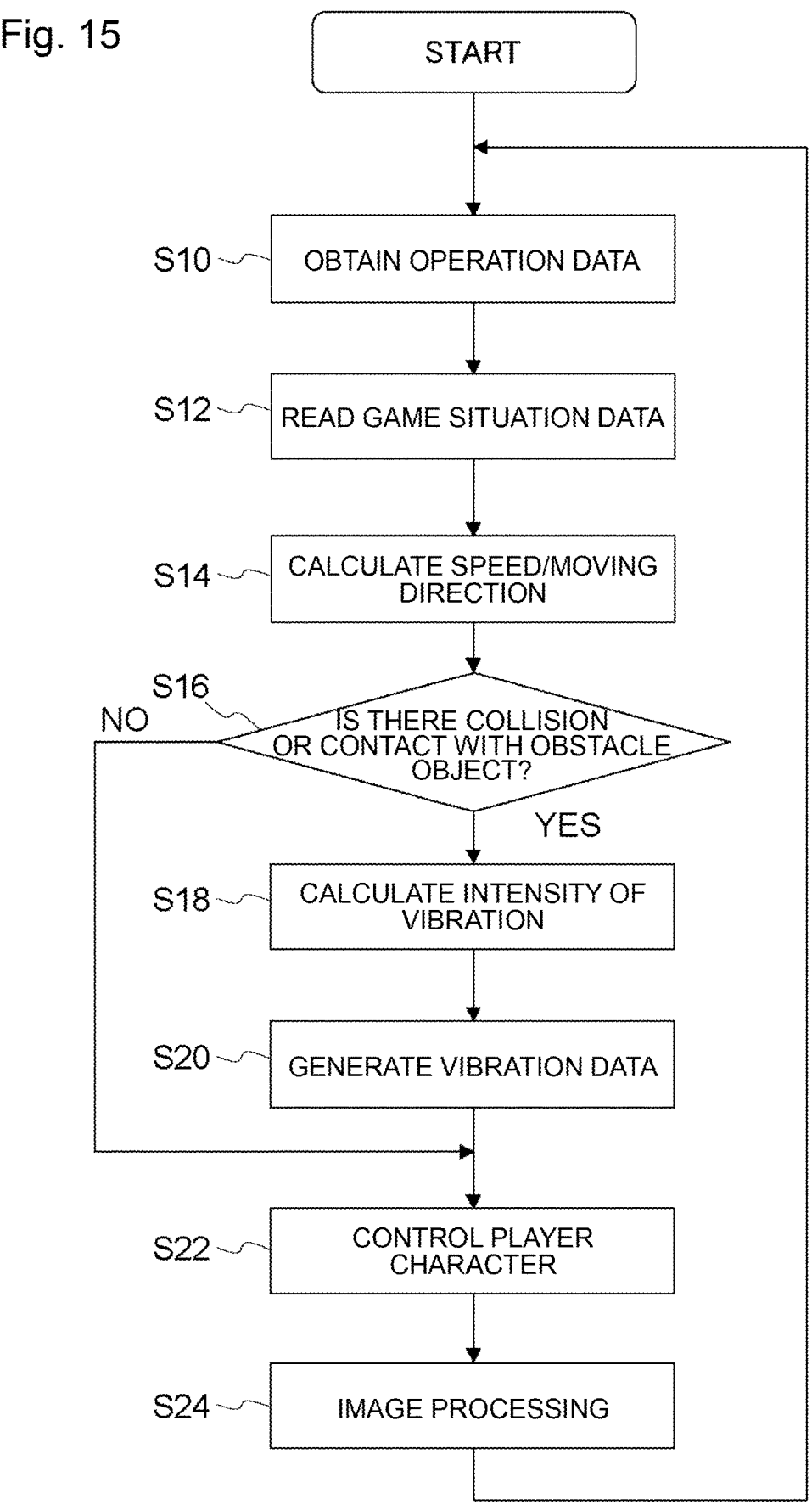

GAME SYSTEM, NON-TRANSITORY STORAGE MEDIUM HAVING STORED THEREIN GAME PROGRAM, INFORMATION PROCESSING APPARATUS, AND GAME CONTROL METHOD

CROSS REFERENCE TO RELATED APPLICATION

This nonprovisional application is based on Japanese Patent Application No. 2017-001341 filed with the Japan Patent Office on Jan. 6, 2017, the entire contents of which are hereby incorporated by reference.

FIELD

The present disclosure relates to a game system with a haptic feedback function, a non-transitory storage medium having stored therein a game program, or the like.

BACKGROUND AND SUMMARY

Conventionally, there has been a known game system having a haptic feedback function. A conventional game system includes a game apparatus connected to a monitor and a controller for giving operation instruction to a game apparatus. The controller has a built-in vibrator, driving of which causes the controller to vibrate. There is also a game system in which a vibration cartridge is inserted into the controller and that can cause the controller to vibrate with the vibration cartridge being inserted.

The game system having a haptic feedback function as described above, for example, includes a game system realizing a game that allows a user to guess a non-displayed object by a haptic stimulus in a state where an object cannot be visually recognized on a monitor. Moreover, there is a game in which it is judged whether a player object hit (collided with or came in contact with) an influential object or an obstacle (another moving object, a stationary object such as a ground, a sea surface, and a wall, an enemy object, an attack object, or the like), and the vibration cartridge is caused to vibrate in a case where it is judged that they hit with each other.

While a game utilizing vibration has been known as described above, an object of the present disclosure is to provide a game system that makes a game situation easier to understand by feedback of vibration according to the situation in the game.

A game system according to one aspect includes: an operation unit; a vibration unit configured to vibrate with a specified intensity; a player character control unit configured to move a player character within a virtual space on the basis of operation onto the operation unit; and a vibration control unit configured to determine a contact between the player character and an uninvadable obstacle object, and configured to cause the vibration unit to vibrate with an intensity corresponding to a traveling direction of the player character with respect to the obstacle object in a case where the operation onto the operation unit is operation of directing the player character toward the obstacle object.

With this configuration, feedback by vibration is performed when the player character comes in contact with the obstacle object and further attempts to head toward the obstacle object, enabling the user to easily grasp the fact that the player character comes in contact with the obstacle object and cannot proceed any further. In addition, since the intensity of vibration changes with the angle of the player character with respect to the obstacle object, it is possible to clearly provide information on the direction of the obstacle object.

The vibration control unit may set the intensity of vibration such that the smaller the angle between the direction in which the player character is traveling and a normal of the obstacle object at a position where the player character comes in contact with the obstacle object, the higher the intensity of vibration. With this configuration, the smaller the angle with respect to the normal of the obstacle object, the higher the vibration becomes, achieving a feeling same as that obtained by coming in contact with an obstacle such as a wall in reality.

The vibration control unit may set the intensity on the basis of a moving speed or acceleration of the player character calculated on the basis of the operation onto the operation unit in a case where it is assumed that there is no obstacle object, and on the basis of the angle formed by the traveling direction of the player character and the normal of the obstacle object. With this configuration, the greater the driving force of the player character, the higher the intensity of vibration, achieving a feeling same as that obtained by coming in contact with an obstacle such as a wall in reality.

The vibration control unit may set the intensity of vibration on the basis of a speed or acceleration of the player character immediately before the player character comes in contact with the obstacle object. With this configuration, it is possible to provide feedback as vibration from an impact generated when the player character first comes in contact with the obstacle object.

The vibration control unit may set the intensity of vibration on the basis of a speed or acceleration of the player character and an angle formed by a traveling direction of the player character and a normal of the obstacle object. With this configuration, the smaller the angle with respect to the normal of the obstacle object, the higher the vibration at the time of contact, achieving a feeling same as that obtained by colliding with an obstacle such as a wall in reality.

The obstacle object may be a terrain object within a virtual space. With this configuration, in a case where the player character's way is blocked by the terrain object, the user can be notified of this by vibration. Examples of the "terrain object" include a rock, a wall, a closed door, a window.

A game system according to another aspect includes: an operation unit; a vibration unit configured to vibrate with a specified intensity; a player character control unit configured to move a player character within a virtual space on the basis of operation onto the operation unit; and a vibration control unit configured to determine a contact between the player character and an uninvadable obstacle object, and configured to cause the vibration unit to vibrate with an intensity corresponding to a moving speed or acceleration of the player character calculated on the basis of the operation onto the operation unit in a case where it is assumed that there is no obstacle object, in a case where the operation onto the operation unit is operation of directing the player character toward the obstacle object.

With this configuration, feedback by vibration is performed when the player character comes in contact with the obstacle object and further attempts to head toward the obstacle object, enabling the user to easily grasp the fact that the player character comes in contact with the obstacle object and cannot proceed any further. Moreover, since the intensity of vibration changes in accordance with the moving speed or the acceleration of the player character, making it possible to notify the user of the difficulty in proceeding forcefully.

A non-transitory storage medium according to one aspect storing a game program for controlling game processing by a computer built in or connected to an apparatus including an operation unit and a vibration unit configured to vibrate at a specified intensity, the game program causing the computer to execute: a step of obtaining operation data of operation performed onto the operation unit; a step of determining a contact between the player character and an uninvadable obstacle object and determining whether there is operation of directing the player character toward the obstacle object on the basis of the operation data; and a step of generating vibration data for causing the vibration unit to vibrate with an intensity corresponding to a traveling direction of the player character with respect to the obstacle object in a case where it is determined that there has been operation of directing the player character toward the obstacle object.

With this configuration, feedback by vibration is performed when the player character comes in contact with the obstacle object and further attempts to head toward the obstacle object, enabling the user to easily grasp the fact that the player character comes in contact with the obstacle object and cannot proceed any further. In addition, since the intensity of vibration changes with the angle of the player character with respect to the obstacle object, it is possible to clearly provide information on the direction of the obstacle object.

The step of generating the vibration data may generate vibration data such that the smaller the angle between the direction in which the player character is traveling and a normal of the obstacle object at a position where the player character comes in contact with the obstacle object, the higher the intensity of vibration. With this configuration, the smaller the angle with respect to the normal of the obstacle object, the higher the vibration becomes, achieving a feeling same as that obtained by coming in contact with an obstacle such as a wall in reality.

The step of generating the vibration data may generate the vibration data on the basis of the moving speed or acceleration of the player character calculated on the basis of the operation data in a case where it is assumed that there is no obstacle object, and on the basis of the angle formed by the traveling direction of the player character and the normal of the obstacle object. With this configuration, the greater the driving force of the player character, the higher the intensity of vibration, achieving a feeling same as that obtained by coming in contact with an obstacle such as a wall in reality.

The step of generating the vibration data may generate the vibration data on the basis of a speed or acceleration of the player character immediately before the player character comes in contact with the obstacle object. With this configuration, it is possible to provide feedback as vibration from an impact generated when the player character first comes in contact with the obstacle object.

The step of generating the vibration data may generate the vibration data on the basis of a speed or acceleration of the player character and an angle formed by a traveling direction of the player character and a normal of the obstacle object. With this configuration, the smaller the angle with respect to the normal of the obstacle object, the higher the vibration at the time of contact, achieving a feeling same as that obtained by colliding with an obstacle such as a wall in reality.

The obstacle object may be a terrain object within a virtual space. With this configuration, in a case where the player character's way is blocked by the terrain object, the user can be notified of this by vibration.

A non-transitory storage medium according to another aspect storing a game program for controlling game processing by a computer built in or connected to an apparatus including an operation unit and a vibration unit configured to vibrate at a specified intensity, the game program causing the computer to execute: a step of obtaining operation data of operation performed onto the operation unit; a step of determining a contact between the player character and an uninvadable obstacle object and determining whether there is operation of directing the player character toward the obstacle object on the basis of the operation data; and a step of generating vibration data for causing the vibration unit to vibrate with an intensity corresponding to a moving speed or acceleration of the player character calculated on the basis of the operation data in a case where it is assumed that there is no obstacle object, in a case where it is determined that there has been operation of directing the player character toward the obstacle object.

With this configuration, feedback by vibration is performed when the player character comes in contact with the obstacle object and further attempts to head toward the obstacle object, enabling the user to easily grasp the fact that the player character comes in contact with the obstacle object and cannot proceed any further. Moreover, since the intensity of vibration changes in accordance with the moving speed or the acceleration of the player character, making it possible to notify the user of the difficulty in proceeding forcefully.

An information processing apparatus according to one aspect is an information processing apparatus built in or connected to an apparatus including an operation unit and a vibration unit configured to vibrate at a specified intensity, the information processing apparatus including: a player character control unit configured to move a player character within a virtual space on the basis of operation onto the operation unit; and a vibration control unit configured to determine a contact between the player character and an uninvadable obstacle object, and configured to cause the vibration unit to vibrate with an intensity corresponding to a traveling direction of the player character with respect to the obstacle object in a case where the operation onto the operation unit is operation of directing the player character toward the obstacle object.

With this configuration, feedback by vibration is performed when the player character comes in contact with the obstacle object and further attempts to head toward the obstacle object, enabling the user to easily grasp the fact that the player character comes in contact with the obstacle object and cannot proceed any further. In addition, since the intensity of vibration changes with the angle of the player character with respect to the obstacle object, it is possible to clearly provide information on the direction of the obstacle object.

An information processing apparatus according to another aspect is an information processing apparatus built in or connected to an apparatus including an operation unit and a vibration unit configured to vibrate at a specified intensity, the information processing apparatus including: a player character control unit configured to move a player character within a virtual space on the basis of operation onto the operation unit; and a vibration control unit configured to determine a contact between the player character and an uninvadable obstacle object, and configured to cause the vibration unit to vibrate with an intensity corresponding to a moving speed or acceleration of the player character calculated on the basis of the operation onto the operation unit in a case where it is assumed that there is no obstacle object, in a case where the operation onto the operation unit is operation of directing the player character toward the obstacle object.

With this configuration, feedback by vibration is performed when the player character comes in contact with the obstacle object and further attempts to head toward the obstacle object, enabling the user to easily grasp the fact that the player character comes in contact with the obstacle object and cannot proceed any further. Moreover, since the intensity of vibration changes in accordance with the moving speed or the acceleration of the player character, making it possible to notify the user of the difficulty in proceeding forcefully.

A game control method according to one aspect is a game control method for controlling game processing by an information processing apparatus built in or connected to an apparatus including an operation unit and a vibration unit configured to vibrate at a specified intensity, the method including: obtaining, by the information processing apparatus, operation data of operation performed onto the operation unit; determining, by the information processing apparatus, a contact between the player character and an uninvadable obstacle object and determining, by the information processing apparatus, whether there is operation of directing the player character toward the obstacle object on the basis of the operation data; and generating, by the information processing apparatus, vibration data for causing the vibration unit to vibrate with an intensity corresponding to a traveling direction of the player character with respect to the obstacle object in a case where it is determined that there has been operation of directing the player character toward the obstacle object.

With this configuration, feedback by vibration is performed when the player character comes in contact with the obstacle object and further attempts to head toward the obstacle object, enabling the user to easily grasp the fact that the player character comes in contact with the obstacle object and cannot proceed any further. In addition, since the intensity of vibration changes with the angle of the player character with respect to the obstacle object, it is possible to clearly provide information on the direction of the obstacle object.

A game control method according to another aspect is a game control method for controlling game processing by an information processing apparatus built in or connected to an apparatus including an operation unit and a vibration unit configured to vibrate at a specified intensity, the method including: obtaining, by the information processing apparatus, operation data of operation performed onto the operation unit; determining, by the information processing apparatus, a contact between the player character and an uninvadable obstacle object and determining, by the information processing apparatus, whether there is operation of directing the player character toward the obstacle object on the basis of the operation data; and generating, by the information processing apparatus, vibration data for causing the vibration unit to vibrate with an intensity corresponding to a moving speed or acceleration of the player character calculated on the basis of the operation data in a case where it is assumed that there is no obstacle object, in a case where it is determined that there has been operation of directing the player character toward the obstacle object.

With this configuration, feedback by vibration is performed when the player character comes in contact with the obstacle object and further attempts to head toward the obstacle object, enabling the user to easily grasp the fact that the player character comes in contact with the obstacle object and cannot proceed any further. Moreover, since the intensity of vibration changes in accordance with the moving speed or the acceleration of the player character, making it possible to notify the user of the difficulty in proceeding forcefully.

The foregoing and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 15 is a flowchart illustrating processing of the main body apparatus according to the present embodiment.

DETAILED DESCRIPTION OF NON-LIMITING EXAMPLE EMBODIMENTS

Hereinafter, a game system according to an example of the present embodiment will be described. An example of a game system 1 in the present embodiment includes a main body apparatus (information processing apparatus, functioning as a game apparatus main body in the present embodiment) 2, a left controller 3, and a right controller 4. The left controller 3 and the right controller 4 are individually detachable from the main body apparatus 2. Specifically, it is possible to use as an integrated apparatus by attaching each of the left controller 3 and the right controller 4 to the main body apparatus 2. Moreover, the main body apparatus 2 and the left controller 3 and the right controller 4 can be used separately (refer to FIG. 2). In the following, a hardware configuration of the game system according to the present embodiment will be described first, and the control of the game system of the present embodiment will then be described.

(Explanation of Main Body Apparatus, Left Controller, and Right Controller)

Figure 1:
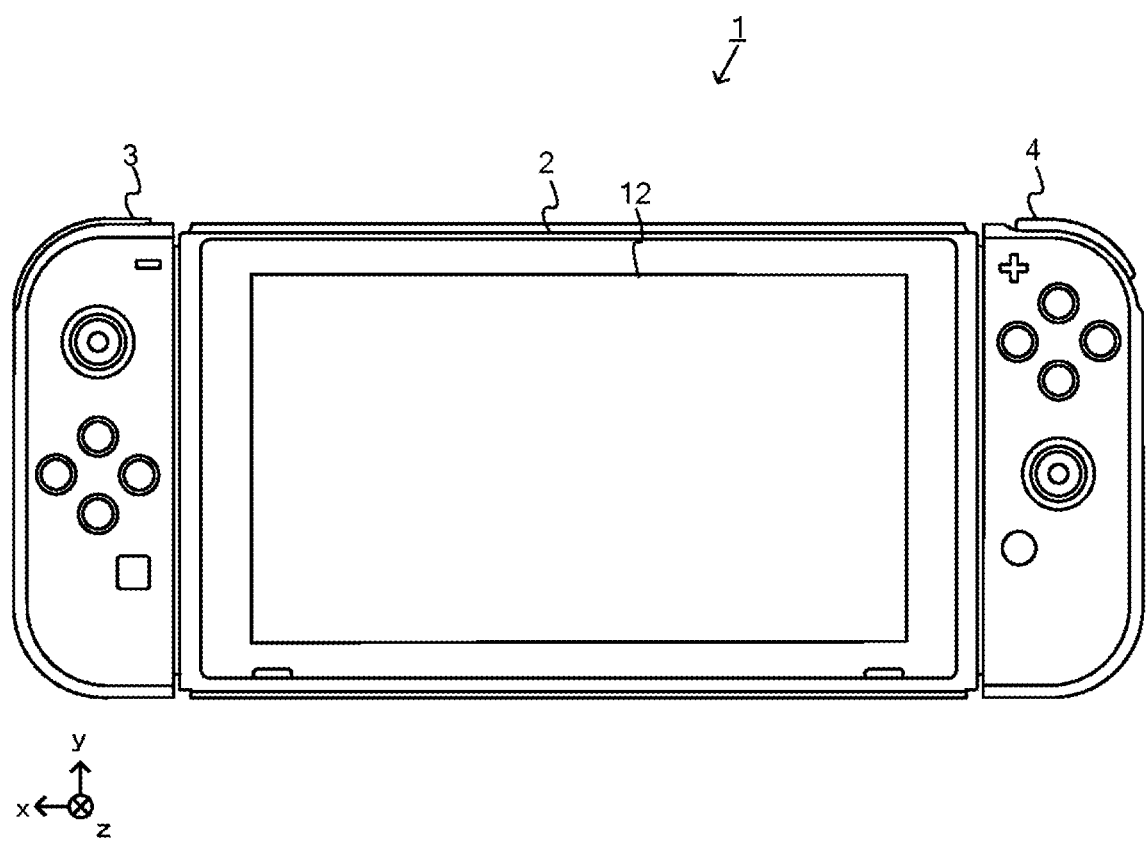
FIG. 1 is a diagram illustrating a state in which a left controller and a right controller are attached to a main body apparatus.

FIG. 1 is a diagram illustrating a state in which the left controller 3 and the right controller 4 are attached to the main body apparatus 2. As illustrated in FIG. 1, the left controller 3 and the right controller 4 are attached to and integrated with the main body apparatus 2. The main body apparatus 2 is an apparatus configured to execute various types of processing (for example, game processing) in the game system 1. The main body apparatus 2 includes a display 12. Each of the left controller 3 and the right controller 4 is an apparatus including an operation unit used by a user to perform input.

Figure 2:
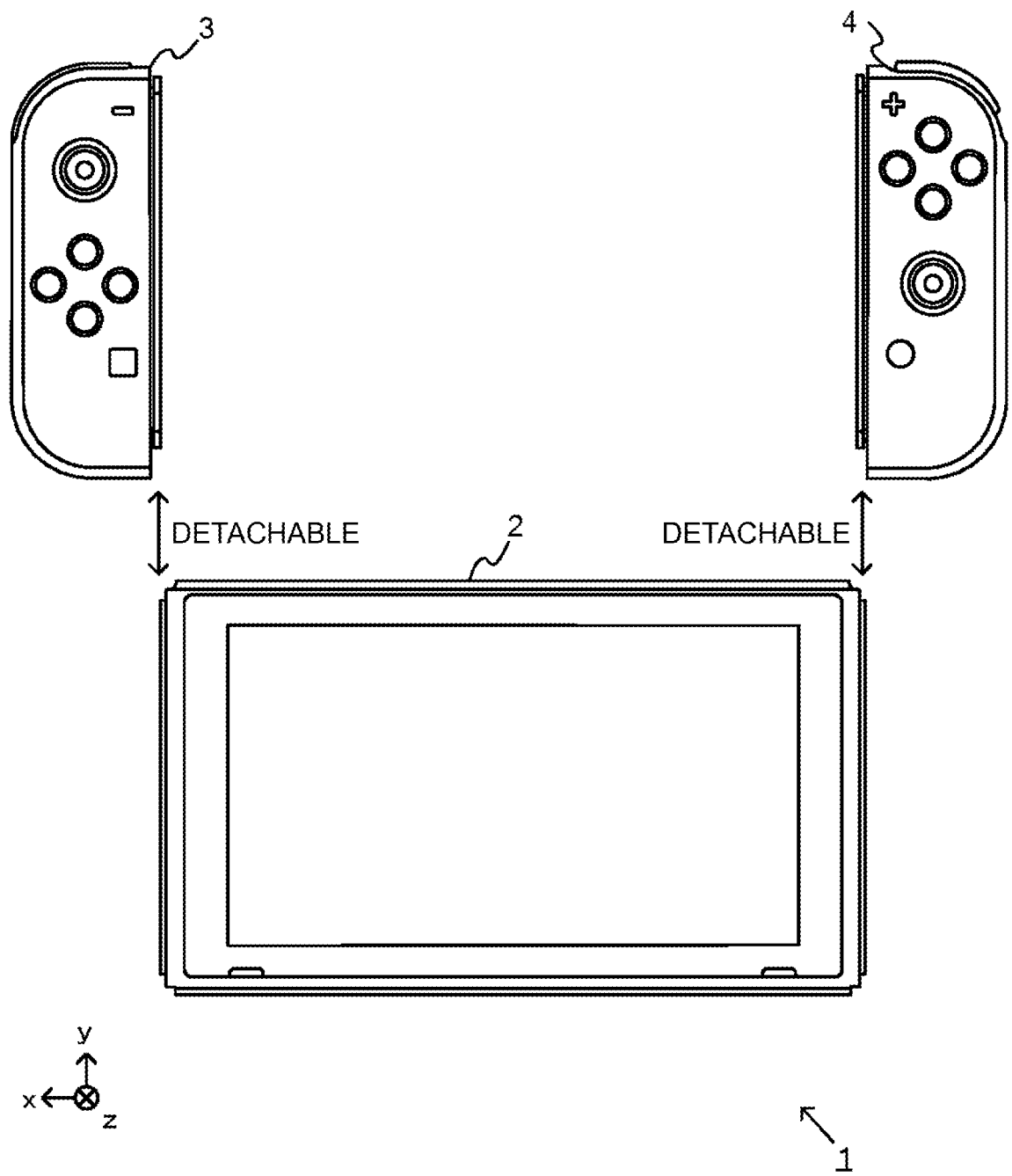
FIG. 2 is a diagram illustrating an exemplary state in which the left controller and the right controller are removed from the main body apparatus.

FIG. 2 is a diagram illustrating an exemplary state in which the left controller 3 and the right controller 4 are removed from the main body apparatus 2. As illustrated in FIGS. 1 and 2, the left controller 3 and the right controller 4 are detachable from the main body apparatus 2. In the following description, the left controller 3 and the right controller 4 will be collectively referred to as the "controller" in some cases.

Figure 3:
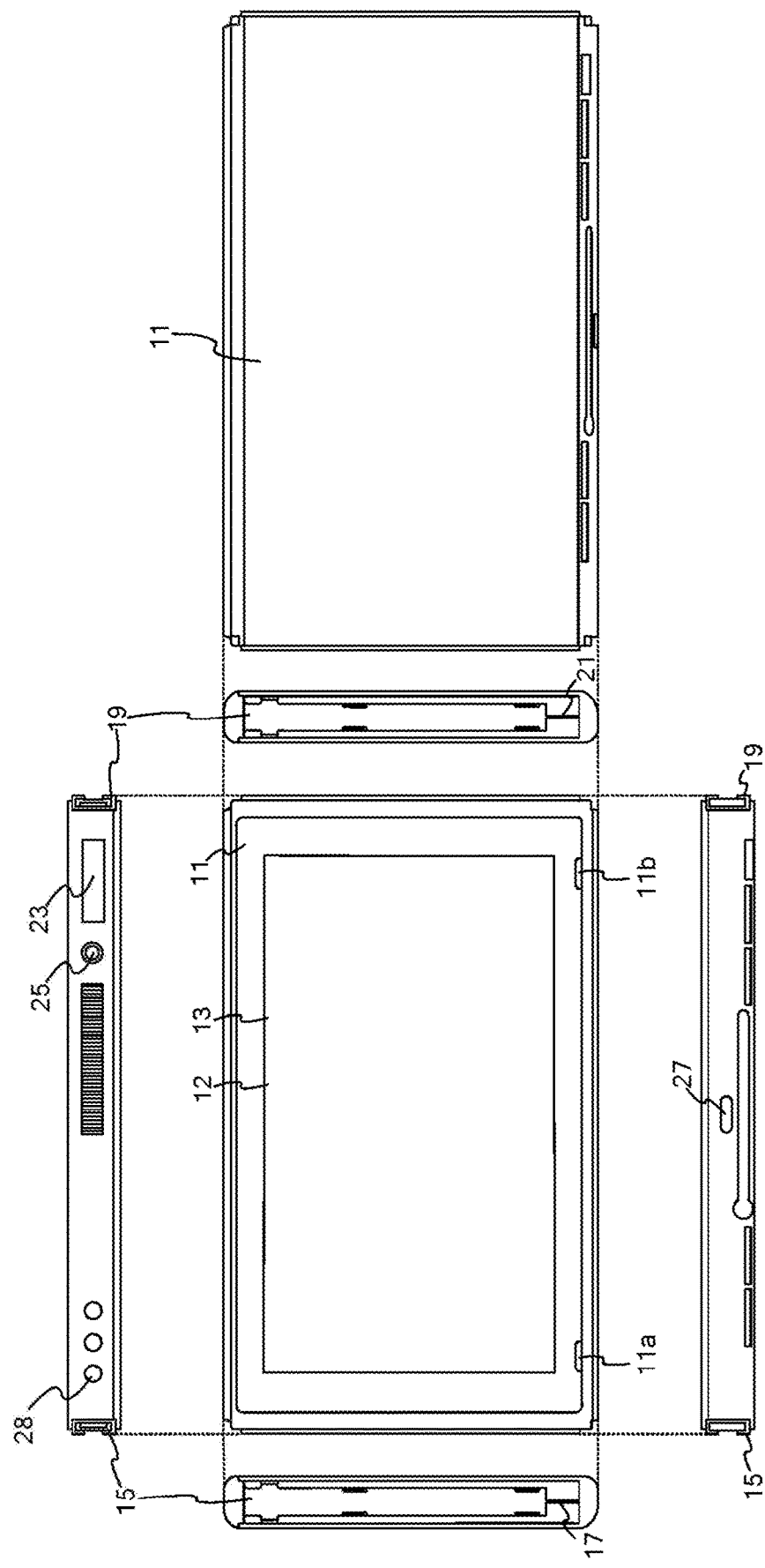
FIG. 3 is a six-sided view illustrating an example of the main body apparatus.

FIG. 3 is a six-sided view illustrating an example of the main body apparatus 2. As illustrated in FIG. 3, the main body apparatus 2 includes a substantially plate-like housing 11. In the present embodiment, a main surface of the housing 11 (in other words, a front-side surface, that is, the surface on which the display 12 is provided) is substantially rectangular in shape.

The shape and size of the housing 11 are arbitrary. For example, the housing 11 may be formed in a mobile size. Moreover, the main body apparatus 2 alone and the integrated apparatus in which the left controller 3 and the right controller 4 are attached to the main body apparatus 2 may be a mobile apparatus. The main body apparatus 2 or the integrated apparatus may be a handheld apparatus. Alternatively, the main body apparatus 2 or the integrated apparatus may be a portable apparatus.

As illustrated in FIG. 3, the main body apparatus 2 includes a display 12 provided on the main surface of the housing 11. The display 12 displays an image generated by the main body apparatus 2. In the present embodiment, the display 12 is a liquid crystal display (LCD). Note that the display 12 may be any type of display apparatus.

The main body apparatus 2 includes a touch panel 13 on a screen of the display 12. In the present embodiment, the touch panel 13 uses a system capable of multi-touch input (for example, capacitance system). Note that the touch panel 13 may use any system, for example, a system capable of single touch input (for example, resistive film system).

The main body apparatus 2 includes a speaker (that is, a speaker 88 illustrated in FIG. 6) inside the housing 11. As illustrated in FIG. 3, speaker holes 11a and 11b are formed on the main surface of the housing 11. The output sound of the speaker 88 is output from each of the speaker holes 11a and 11b.

Moreover, the main body apparatus 2 includes a left side terminal 17 as a terminal used by the main body apparatus 2 to perform wired communication with the left controller 3, and a right side terminal 21 used by the main body apparatus 2 to perform wired communication with the right controller 4.

As illustrated in FIG. 3, the main body apparatus 2 includes a slot 23. The slot 23 is provided on the upper side surface of the housing 11. The slot 23 has a shape that enables a storage medium to be attached. The storage medium is, for example, a storage medium (for example, a dedicated memory card) dedicated to the game system 1 and the information processing apparatus of the same type as the game system 1. The storage medium is used for storing, for example, one or both of the data (for example, saved data of an application) used in the main body apparatus 2 and a program (for example, an application program) executed in the main body apparatus 2. Moreover, the main body apparatus 2 includes a power button 28.

The main body apparatus 2 includes a lower terminal 27. The lower terminal 27 is a terminal used by the main body apparatus 2 to communicate with a cradle. In the present embodiment, the lower terminal 27 is a USB connector (more specifically, a female connector). When the integrated apparatus or the main body apparatus 2 alone is mounted on the cradle, the game system 1 can display an image generated and output by the main body apparatus 2, on the stationary monitor. Moreover, in the present embodiment, the cradle has a function of charging the above-described integrated apparatus or the main body apparatus 2 alone mounted on the cradle. The cradle also has a function of a hub apparatus (specifically, a USB hub).

Figure 4:
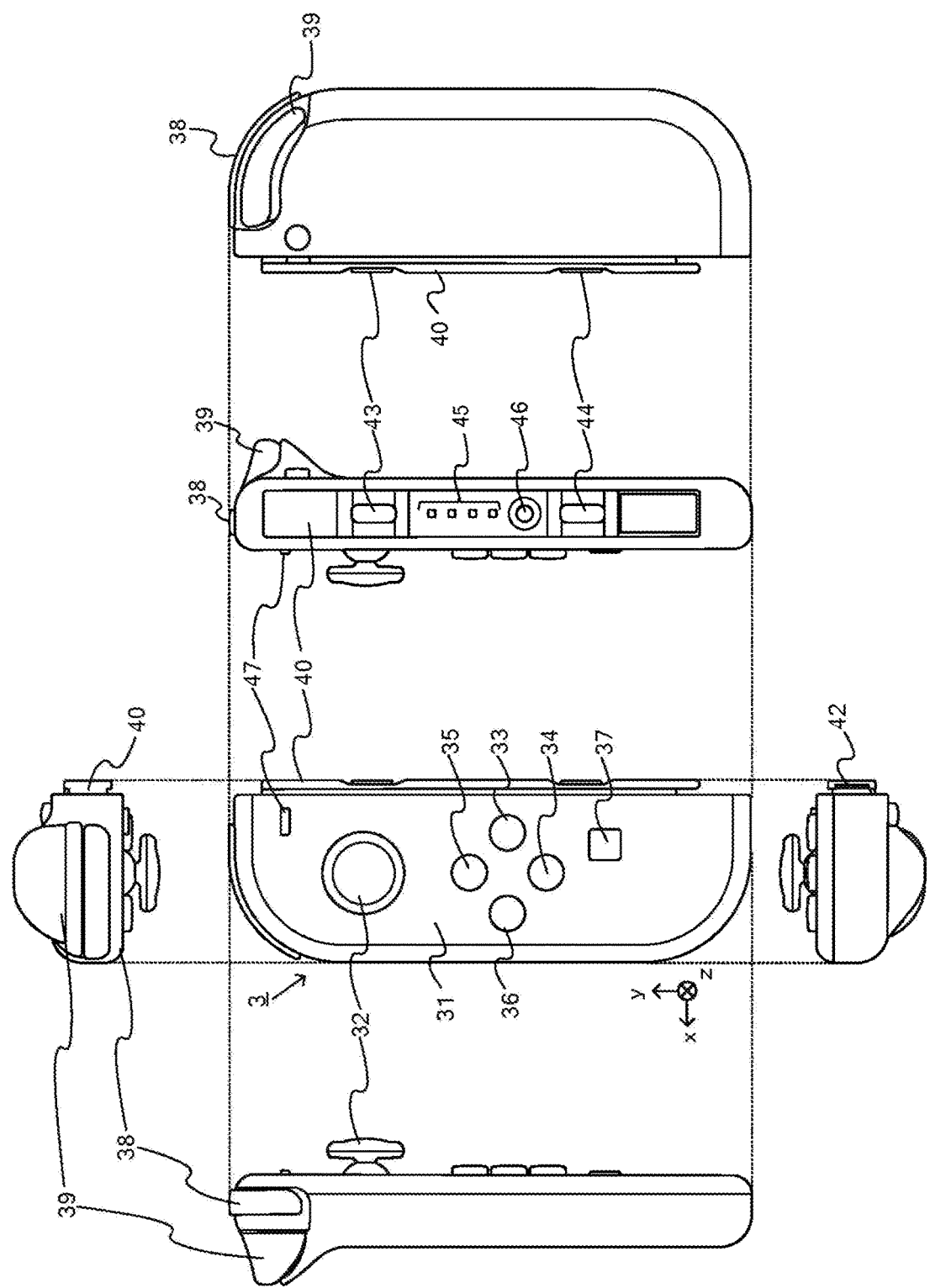
FIG. 4 is a six-sided view illustrating an example of the left controller.

FIG. 4 is a six-sided view illustrating an example of the left controller 3. As illustrated in FIG. 4, the left controller 3 includes a housing 31. In the present embodiment, the housing 31 has a vertically long shape, that is, a long shape in the vertical direction (that is, in the y-axis direction illustrated in FIG. 1). The left controller 3 can also be held in a vertically long orientation in a state detached from the main body apparatus 2. The housing 31 has a shape and size that can be held with one hand, in particular with the left hand, in a case of being held in a vertically long orientation. Moreover, the left controller 3 can also be held in a landscape orientation. In the case where the left controller 3 is held in a landscape orientation, it may be held with both hands.

The left controller 3 includes an analog stick 32. As illustrated in FIG. 4, the analog stick 32 is provided on the main surface of the housing 31. The analog stick 32 can be used as a direction input unit capable of inputting a direction. By inclining the analog stick 32, the user can input a direction corresponding to the inclination direction (and input with a size corresponding to the inclined angle). Instead of the analog stick, a cross key or a slide stick capable of slide input may be provided as the direction input unit. Moreover, an input by pressing the analog stick is possible in the present embodiment.

The left controller 3 includes various operation buttons. First, the left controller 3 includes four operation buttons 33 to 36 (specifically, a right direction button 33, a down direction button 34, an up direction button 35, and a left direction button 36) on the main surface of the housing 31. Furthermore, it has a recording button 37 and a − (minus sign) button 47. The left controller 3 includes a first L button 38 and a ZL button 39 on the upper left of the side surface of the housing 31. The left controller 3 also includes a second L button 43 and a second R button 44 on the side surface of the housing 31, the side to be attached when it is attached to the main body apparatus 2. These operation buttons are used to give instructions according to various programs (for example, OS program and application program) executed by the main body apparatus 2.

Moreover, the left controller 3 includes a terminal 42 used by the left controller 3 to perform wired communication with the main body apparatus 2.

Figure 5:
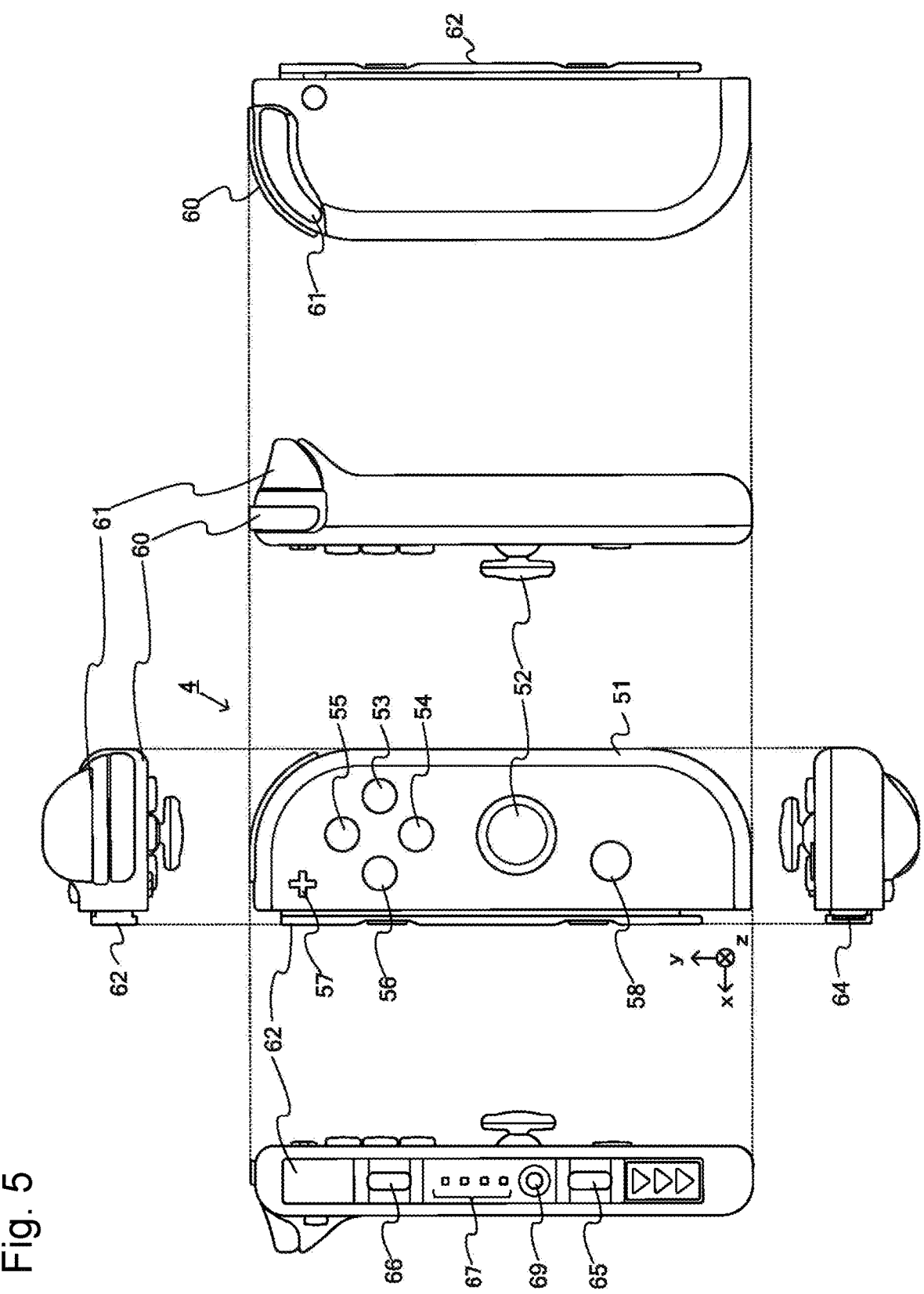
FIG. 5 is a six-sided view illustrating an example of the right controller.

FIG. 5 is a six-sided view illustrating an example of the right controller 4. As illustrated in FIG. 5, the right controller 4 includes a housing 51. In the present embodiment, the housing 51 has a vertically long shape, that is, a long shape in the vertical direction. The right controller 4 can also be held in a vertically long orientation in a state detached from the main body apparatus 2. The housing 51 has a shape and size that can be held with one hand, in particular with the right hand, in a case of being held in a vertically long orientation. Moreover, the right controller 4 can also be held in a landscape orientation. In the case where the right controller 4 is held in a landscape orientation, it may be held with both hands.

Similarly to the left controller 3, the right controller 4 includes an analog stick 52 as a direction input unit. In the present embodiment, the analog stick 52 has the same configuration as the analog stick 32 of the left controller 3. Instead of the analog stick, a cross key or a slide stick capable of inputting a slide or the like may be provided. Similarly to the left controller 3, the right controller 4 includes four operation buttons 53 to 56 (specifically, A button 53, B button 54, X button 55, and Y button 56) on the main surface of the housing 51. Furthermore, the right controller 4 includes a + (plus sign) button 57 and a home button 58. The right controller 4 also includes a first R button 60 and a ZR button 61 on the upper right of the side surface of the housing 51. Similarly to the left controller 3, the right controller 4 includes a second L button 65 and a second R button 66.

Moreover, the right controller 4 includes a terminal 64 used by the right controller 4 to perform wired communication with the main body apparatus 2.

Figure 6:
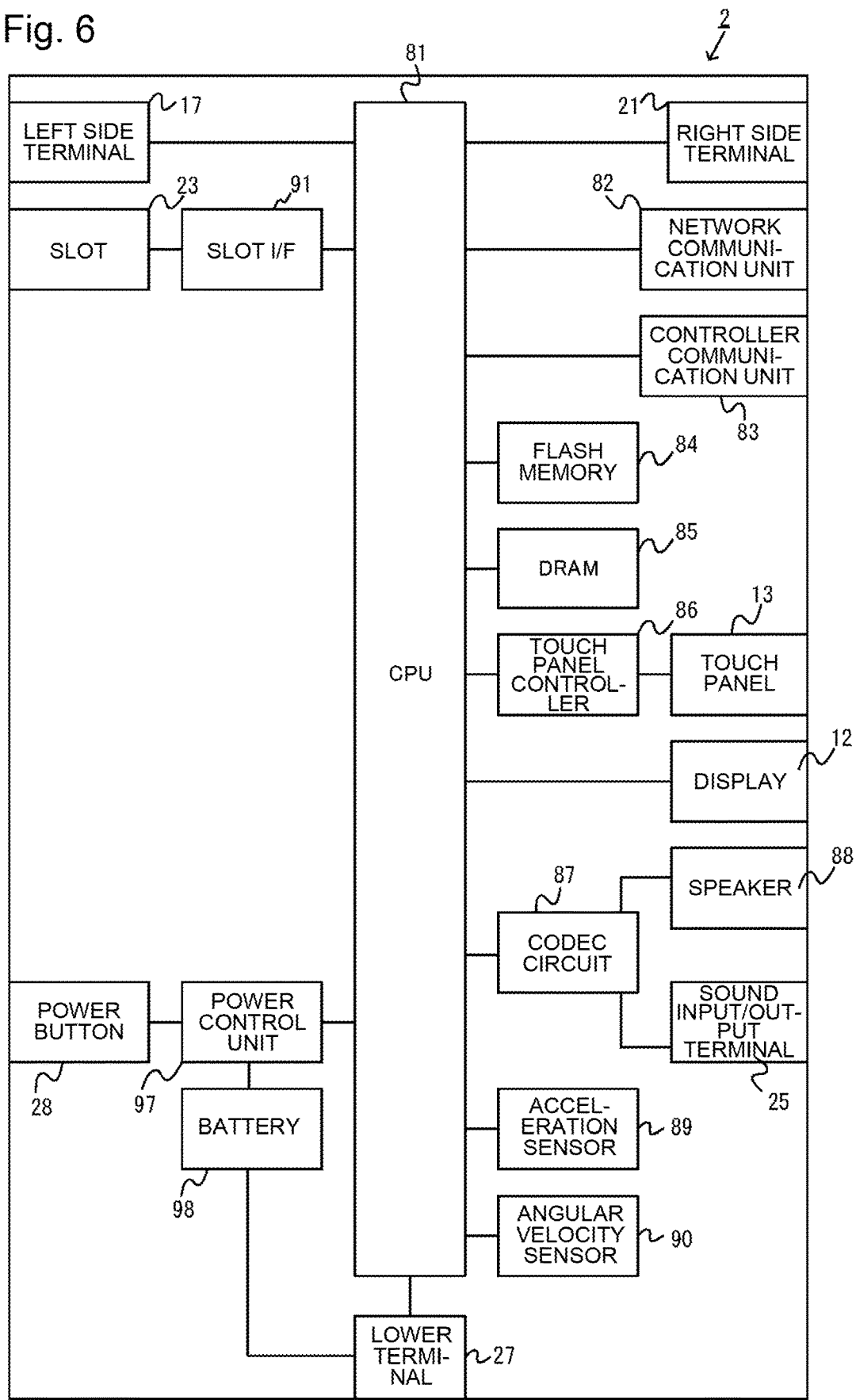
FIG. 6 is a block diagram illustrating an example of the internal configuration of the main body apparatus.

FIG. 6 is a block diagram illustrating an example of the internal configuration of the main body apparatus 2. In addition to the configuration illustrated in FIG. 3, the main body apparatus 2 includes individual components 81 to 98 illustrated in FIG. 6. Some of these components 81 to 98 may be mounted on an electronic circuit board as electronic components and stored in the housing 11.

The main body apparatus 2 includes a central processing unit (CPU) 81. The CPU 81 is an information processing unit that executes various types of information processing to be executed in the main body apparatus 2, and more particularly, is a system-on-a-chip (SoC) including a plurality of functions such as a CPU function and a GPU function. The CPU 81 executes various types of information processing by executing an information processing program (for example, a game program) stored in a storage unit (specifically, an internal storage medium such as a flash memory 84 or an external storage medium attached to the slot 23, or the like).

The main body apparatus 2 includes the flash memory 84 and a dynamic random access memory (DRAM) 85 as an exemplary internal storage medium incorporated in oneself. The flash memory 84 and the DRAM 85 are connected to the CPU 81. The flash memory 84 is mainly used for storing various data (or may be programs) stored in the main body apparatus 2. The DRAM 85 is a memory used for temporarily storing various data used in information processing.

The main body apparatus 2 includes a slot interface (hereinafter abbreviated as "I/F") 91. The slot I/F 91 is connected to the CPU 81. The slot I/F 91 is connected to the slot 23, and performs reading and writing of data from/into a storage medium (for example, a dedicated memory card) attached to the slot 23 in accordance with an instruction of the CPU 81.

The CPU 81 appropriately reads or writes data to and from the flash memory 84 and the DRAM 85 and the individual storage media, thereby executing the above-described information processing.

The main body apparatus 2 includes a network communication unit 82. The network communication unit 82 is connected to the CPU 81. The network communication unit 82 performs communication (specifically, wireless communication) with an external apparatus via a network. In the present embodiment, the network communication unit 82 communicates with an external apparatus using a wireless LAN connection with a method conforming to the Wi-Fi standard as a first communication mode. Moreover, the network communication unit 82 performs wireless communication with another main body apparatus 2 of the same type by a predetermined communication method (for example, communication based on a proprietary protocol or infrared communication) as a second communication mode. Note that the wireless communication according to the second communication mode is capable of performing wireless communication with another main body apparatus 2 arranged in a closed local network area and achieves a function enabling "local communication" of transferring data by directly communicating among a plurality of main body apparatuses 2.

The main body apparatus 2 includes a controller communication unit 83. The controller communication unit 83 is connected to the CPU 81. The controller communication unit 83 performs wireless communication with one or both of the left controller 3 and the right controller 4. While it is allowable to use any communication system between the main body apparatus 2 and the left controller 3 and between the main body apparatus 2 and the right controller 4, the present embodiment uses communication conforming to Bluetooth (registered trademark) standard to be used for communication by the controller communication unit 83 with the left controller 3 and with the right controller 4.

The CPU 81 is connected to the left side terminal 17, the right side terminal 21, and the lower terminal 27 described above. In a case of performing wired communication with the left controller 3, the CPU 81 transmits data to the left controller 3 via the left side terminal 17 and receives operation data from the left controller 3 via the left side terminal 17. Moreover, in a case of performing wired communication with the right controller 4, the CPU 81 transmits data to the right controller 4 via the right side terminal 21 and receives operation data from the right controller 4 via the right side terminal 21. Moreover, in a case of communicating with the cradle, the CPU 81 transmits data to the cradle via the lower terminal 27. In this manner, in the present embodiment, the main body apparatus 2 can perform both wired communication and wireless communication with the left controller 3 and the right controller 4. Moreover, in a case where the integrated apparatus including the left controller 3 and the right controller 4 attached to the main body apparatus 2 is attached to the cradle or where the main body apparatus 2 alone is attached to the cradle, the main body apparatus 2 can output data (for example, image data and sound data) to the stationary monitor, or the like, via the cradle.

Note that the main body apparatus 2 can communicate simultaneously (in other words, in parallel) with a plurality of left controllers 3. Moreover, the main body apparatus 2 can communicate simultaneously (in other words, in parallel) with a plurality of right controllers 4. This makes it possible to perform inputs by the user into the main body apparatus 2 using the plurality of left controllers 3 and the plurality of right controllers 4.

The main body apparatus 2 includes a touch panel controller 86 as a circuit for controlling the touch panel 13. The touch panel controller 86 is connected between the touch panel 13 and the CPU 81. The touch panel controller 86 generates, for example, data indicating a position of input of a touch input on the basis of a signal from the touch panel 13 and outputs the generated data to the CPU 81.

Moreover, the display 12 is connected to the CPU 81. The CPU 81 displays on the display 12 one or both of the generated image (for example, by executing the above information processing) and the image obtained from the outside.

The main body apparatus 2 includes a coder/decoder (codec) circuit 87 and speakers (specifically, a left speaker and a right speaker) 88. The codec circuit 87 is connected to the speaker 88 and a sound input/output terminal 25, and is also connected to the CPU 81. The codec circuit 87 is a circuit for controlling input and output of sound data to and from the speaker 88 and the sound input/output terminal 25.

The main body apparatus 2 also includes an acceleration sensor 89. In the present embodiment, the acceleration sensor 89 detects the magnitude of the acceleration in predetermined three axes (for example, the x-, y-, z-axes illustrated in FIG. 1) directions. Note that the acceleration sensor 89 may be configured to detect accelerations in one axial direction or two axial directions.

Moreover, the main body apparatus 2 includes an angular velocity sensor 90. In the present embodiment, the angular velocity sensor 90 detects an angular velocity around predetermined three axes (for example, the x-, y-, z-axes illustrated in FIG. 1). Note that the angular velocity sensor 90 may detect angular velocity about one axis or around two axes.

The acceleration sensor 89 and the angular velocity sensor 90 are connected to the CPU 81, and the detection results of the acceleration sensor 89 and the angular velocity sensor 90 are output to the CPU 81. The CPU 81 can calculate information related to one or both of the movement and posture of the main body apparatus 2 on the basis of the detection results of the acceleration sensor 89 and the angular velocity sensor 90.

The main body apparatus 2 includes a power control unit 97 and a battery 98. The power control unit 97 is connected to the battery 98 and the CPU 81. Although not illustrated, the power control unit 97 is connected to each of portions of the main body apparatus 2 (specifically, each of portions receiving the power supply of the battery 98, the left side terminal 17, and the right side terminal 21). The power control unit 97 controls power supply from the battery 98 to each of the above-described portions on the basis of a command from the CPU 81.

Moreover, the battery 98 is connected to the lower terminal 27. In a case where an external charging apparatus (for example, a cradle) is connected to the lower terminal 27 and the power is supplied to the main body apparatus 2 via the lower terminal 27, the supplied power is charged in the battery 98.

Figure 7:
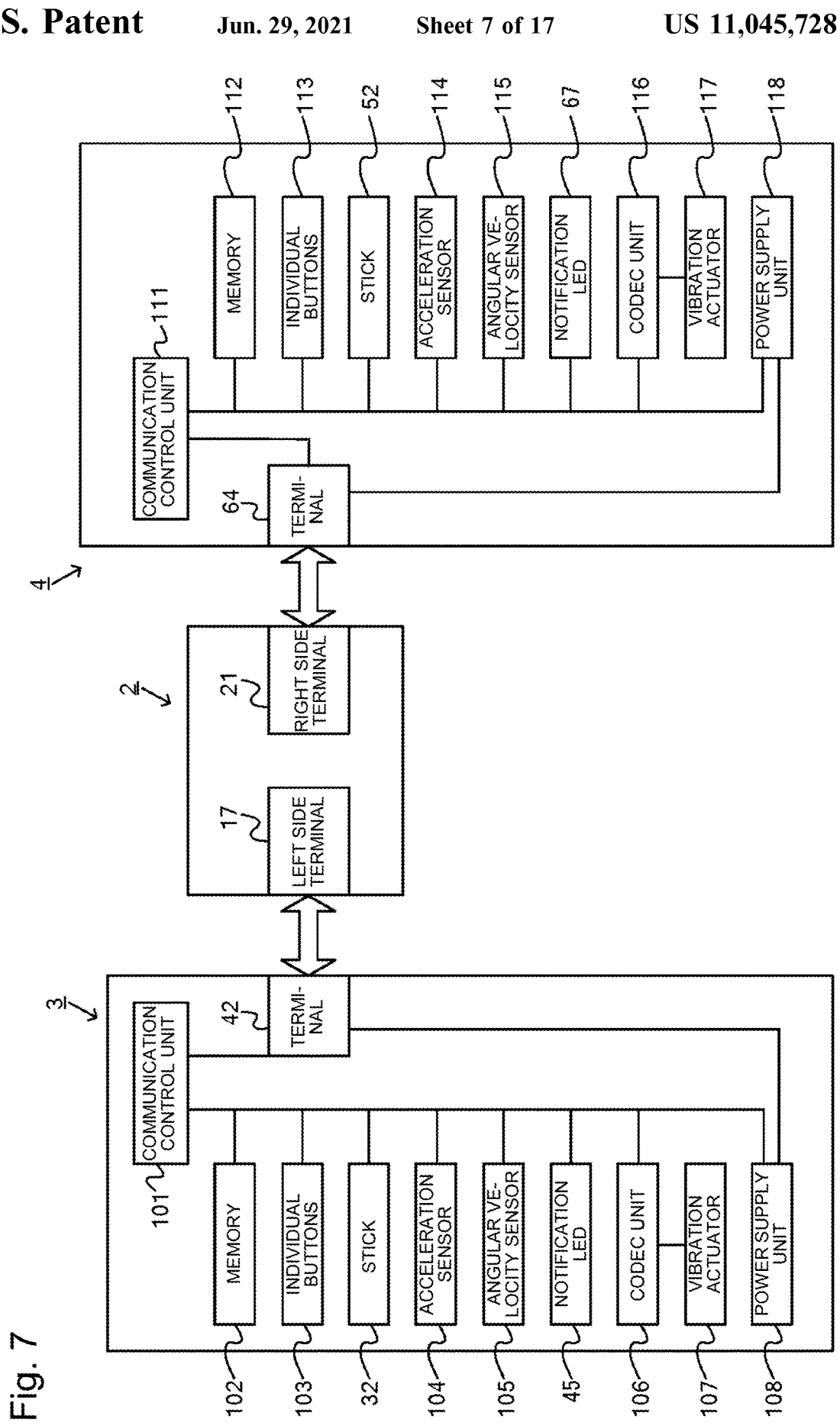
FIG. 7 is a block diagram illustrating an exemplary internal configuration of the main body apparatus, the left controller, and the right controller.

FIG. 7 is a block diagram illustrating an exemplary internal configuration of the main body apparatus 2, the left controller 3, and the right controller 4. Note that details of the internal configuration related to the main body apparatus 2 are omitted in FIG. 7 because they are illustrated in FIG. 6.

The left controller 3 includes a communication control unit 101 that communicates with the main body apparatus 2. As illustrated in FIG. 7, the communication control unit 101 is connected to each of components including the terminal 42. In the present embodiment, the communication control unit 101 can communicate with the main body apparatus 2 by both wired communication via the terminal 42 and wireless communication not via the terminal 42. The communication control unit 101 controls a communication method performed by the left controller 3 on the main body apparatus 2. That is, in a case where the left controller 3 is attached to the main body apparatus 2, the communication control unit 101 communicates with the main body apparatus 2 via the terminal 42. In contrast, in a case where the left controller 3 is detached from the main body apparatus 2, the communication control unit 101 performs wireless communication with the main body apparatus 2 (specifically, the controller communication unit 83). Wireless communication between the controller communication unit 83 and the communication control unit 101 is performed in accordance with the Bluetooth (registered trademark) standard, for example.

Moreover, the left controller 3 includes a memory 102 such as a flash memory. The communication control unit 101 is formed with, for example, a microcomputer (also referred to as a microprocessor) and executes various types of processing by executing firmware stored in the memory 102.

The left controller 3 includes individual buttons 103 (specifically, buttons 33 to 39, 43, 44, 46, and 47). The left controller 3 also includes the analog stick 32 (described as "stick" in FIG. 7). Individual buttons 103 and the analog stick 32 repeatedly output information related to the operation performed on oneself to the communication control unit 101 at an appropriate timing.

The left controller 3 includes an inertial sensor. Specifically, the left controller 3 includes an acceleration sensor 104. In addition, it includes an angular velocity sensor 105. In the present embodiment, the acceleration sensor 104 detects the magnitude of the acceleration in predetermined three axes (for example, the x-, y-, z-axes illustrated in FIG. 4) directions. Note that the acceleration sensor 104 may be configured to detect accelerations in one axial direction or two axial directions. In the present embodiment, the angular velocity sensor 105 detects an angular velocity around predetermined three axes (for example, the x-, y-, z-axes illustrated in FIG. 4). Note that the angular velocity sensor 105 may detect angular velocity about one axis or around two axes. Each of the acceleration sensor 104 and the angular velocity sensor 105 is connected to the communication control unit 101. Then, the detection results of the acceleration sensor 104 and the angular velocity sensor 105 are repeatedly output to the communication control unit 101 at an appropriate timing.

The communication control unit 101 obtains information related to the input (specifically, information related to the operation or a detection result by the sensor) from each of input units (specifically, the individual buttons 103, the analog stick 32, the sensors 104 and 105). The communication control unit 101 transmits the operation data including the obtained information (or the information obtained by performing predetermined processing on the obtained information) to the main body apparatus 2. The operation data is repeatedly transmitted at a rate of once every predetermined time. The interval at which the information related to the input is transmitted to the main body apparatus 2 may either be the same or not the same for individual input units.

With transmission of the above-described operation data to the main body apparatus 2, the main body apparatus 2 can obtain the input performed onto the left controller 3. That is, the main body apparatus 2 can distinguish the operation onto the individual buttons 103 and the analog stick 32 on the basis of the operation data. Moreover, the main body apparatus 2 can calculate information related to one or both of the movement and the posture of the left controller 3 on the basis of operation data (specifically, detection results of the acceleration sensor 104 and the angular velocity sensor 105).

The left controller 3 includes a vibration actuator 107 for notifying the user by vibration. In the present embodiment, the vibration actuator 107 is controlled by a command from the main body apparatus 2. That is, upon receiving the command from the main body apparatus 2, the communication control unit 101 drives the vibration actuator 107 in accordance with the command. The left controller 3 includes a codec unit 106. Upon receiving the above-described command, the communication control unit 101 outputs to the codec unit 106 a control signal corresponding to the command. The codec unit 106 generates a drive signal for driving the vibration actuator 107 from the control signal from the communication control unit 101 and supplies the generated signal to the vibration actuator 107. This causes the vibration actuator 107 to operate.

More specifically, the vibration actuator 107 is a linear vibrating motor. The linear vibrating motor is driven in a predetermined direction in accordance with the input voltage, unlike a normal motor that makes a rotational motion. Accordingly, the linear vibrating motor can generate vibration at the amplitude and a frequency in accordance with the waveform of the input voltage. In the present embodiment, a vibration control signal transmitted from the main body apparatus 2 to the left controller 3 may be a digital signal representing frequency and amplitude per unit time. While, in another embodiment, it is allowable to transmit information indicating the waveform itself, it would be possible to reduce the amount of communication data by transmitting amplitude and frequency alone. Moreover, in order to further reduce the data amount, it would be also allowable to transmit solely the difference from a previous value instead of the values of the amplitude and frequency at that time. In this case, the codec unit 106 converts a digital signal indicating the values of the amplitude and the frequency obtained from the communication control unit 101 into an analog voltage waveform and inputs a voltage in accordance with the waveform, thereby driving the vibration actuator 107. With this configuration, the main body apparatus 2 can control the amplitude and the frequency at which the vibration actuator 107 is vibrated at that time by changing the amplitude and frequency to be transmitted per unit time. Note that the amplitude and the frequency transmitted from the main body apparatus 2 to the left controller 3 are not limited to one, and two or more may be transmitted. In this case, the codec unit 106 can generate a waveform of the voltage for controlling the vibration actuator 107 by combining the waveforms indicated by the plurality of received amplitudes and frequencies.

The left controller 3 includes a power supply unit 108. In the present embodiment, the power supply unit 108 includes a battery and a power control circuit. Although not illustrated, the power control circuit is connected to the battery and is also connected to each of portions of the left controller 3 (specifically, each of portions receiving power supply of the battery).

As illustrated in FIG. 7, the right controller 4 includes a communication control unit 111 that communicates with the main body apparatus 2. The right controller 4 also includes a memory 112 connected to the communication control unit 111. The communication control unit 111 is connected to each of the components including the terminal 64. The communication control unit 111 and the memory 112 have the functions similar to the functions of the communication control unit 101 and the memory 102 of the left controller 3. Accordingly, the communication control unit 111 can communicate with the main body apparatus 2 in both wired communication via the terminal 64 and wireless communication not via the terminal 64 (specifically, communication conforming to the Bluetooth (registered trademark) standard) and controls the communication method performed by the right controller 4 onto the main body apparatus 2.

The right controller 4 includes individual input units similar to the individual input units of the left controller 3. Specifically, the right controller 4 includes the individual buttons 113, the analog stick 52, and an inertial sensor (an acceleration sensor 114 and an angular velocity sensor 115). Each of these input units has functions similar to individual input units of the left controller 3 and operates in the similar manner.

The right controller 4 also includes a vibration actuator 117 and a codec unit 116. The vibration actuator 117 and the codec unit 116 operate similarly to the vibration actuator 107 and the codec unit 106 of the left controller 3. That is, the communication control unit 111 causes the vibration actuator 117 to operate using the codec unit 116 in accordance with a command from the main body apparatus 2.

The right controller 4 includes a power supply unit 118. The power supply unit 118 has functions similar to the functions of the power supply unit 108 of the left controller 3 and operates in the similar manner.

(Game Control Using Each of Controllers)

In the present embodiment, the user performs a predetermined game using the game system 1. For example, the user moves a player character displayed on the display 12 of the main body apparatus 2 within a game space and performs a game of fighting against a predetermined enemy character. In the present embodiment, the user can play the game alone, or a plurality of players can play the game. In a case where the user performs the game alone, the user moves an own player character P within a game space and fights against the enemy character (non-player character) controlled by the main body apparatus 2. When playing a game by a plurality of players, a plurality of the main body apparatuses 2 communicate with each other (for example, wireless communication, communication via a LAN, or communication via the Internet), and each of the users fights by operating one's own player character.

Figure 8:
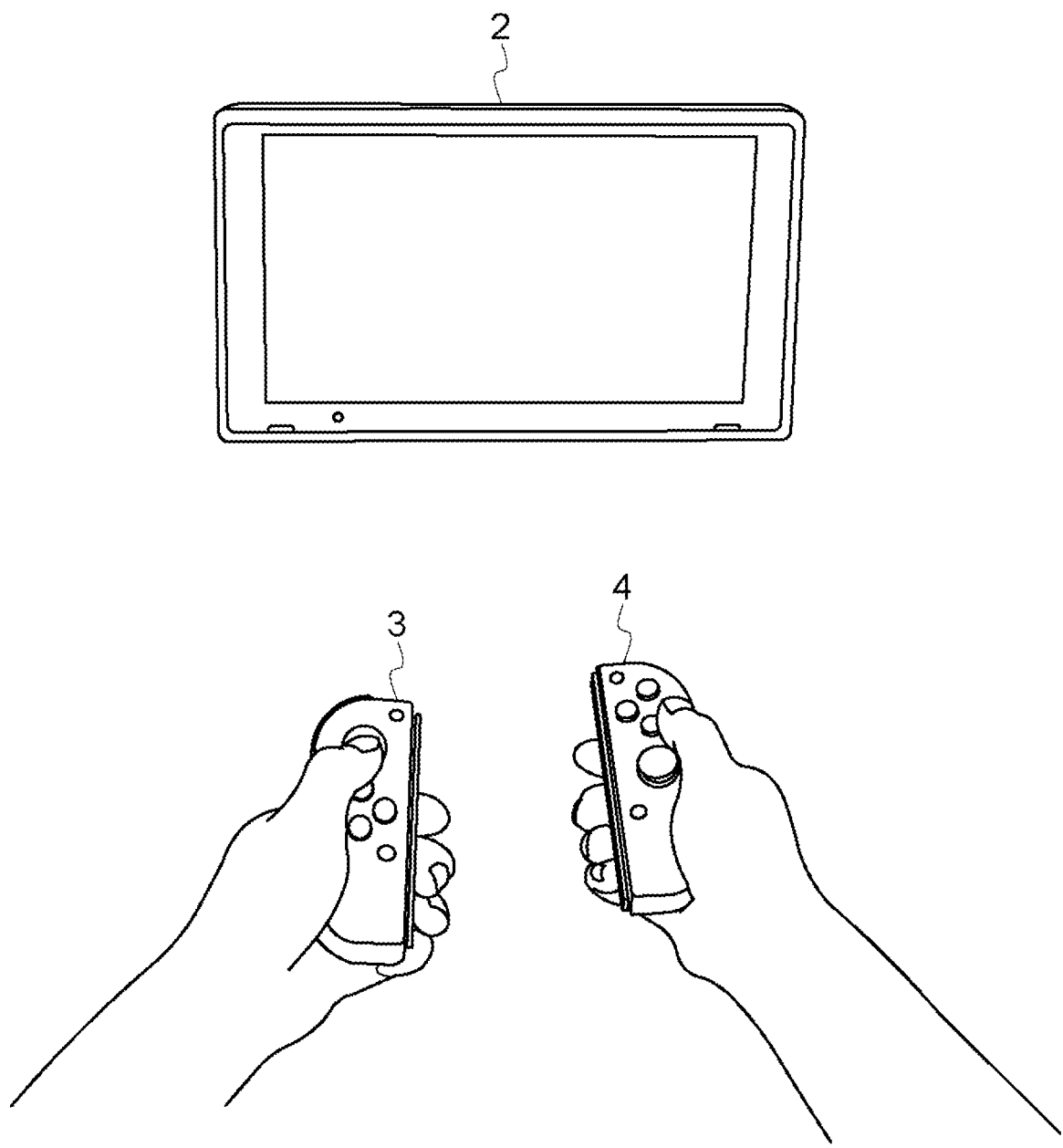
FIG. 8 is a diagram illustrating an exemplary state in which a game is played with the left controller and the right controller removed from the main body apparatus.

In the present embodiment, the user can use the game system 1 with the left controller 3 and the right controller 4 being removed from the main body apparatus 2. FIG. 8 is a diagram illustrating an exemplary state in which a single user uses the game system 1 while holding the left controller 3 with his left hand and holding the right controller 4 with his right hand. In this case, as illustrated in FIG. 8, the positional relationship between the left controller 3 and the right controller 4 is not fixed, making it possible to move both the controllers 3 and 4 freely. As illustrated in FIG. 1, it is also possible for the user to perform game operation with the left controller 3 and the right controller 4 attached on the main body apparatus 2.

(Operation Data Output from Each of Controllers)

Figure 9:
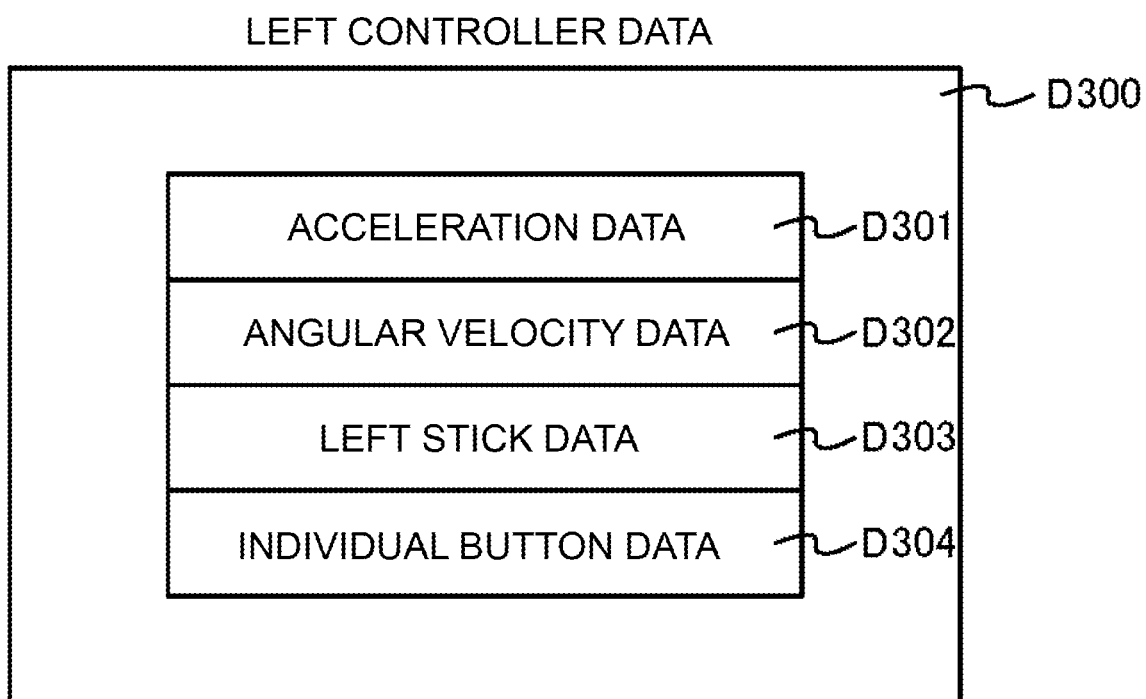
FIG. 9 is a diagram illustrating exemplary operation data output from the left controller.
Figure 10:
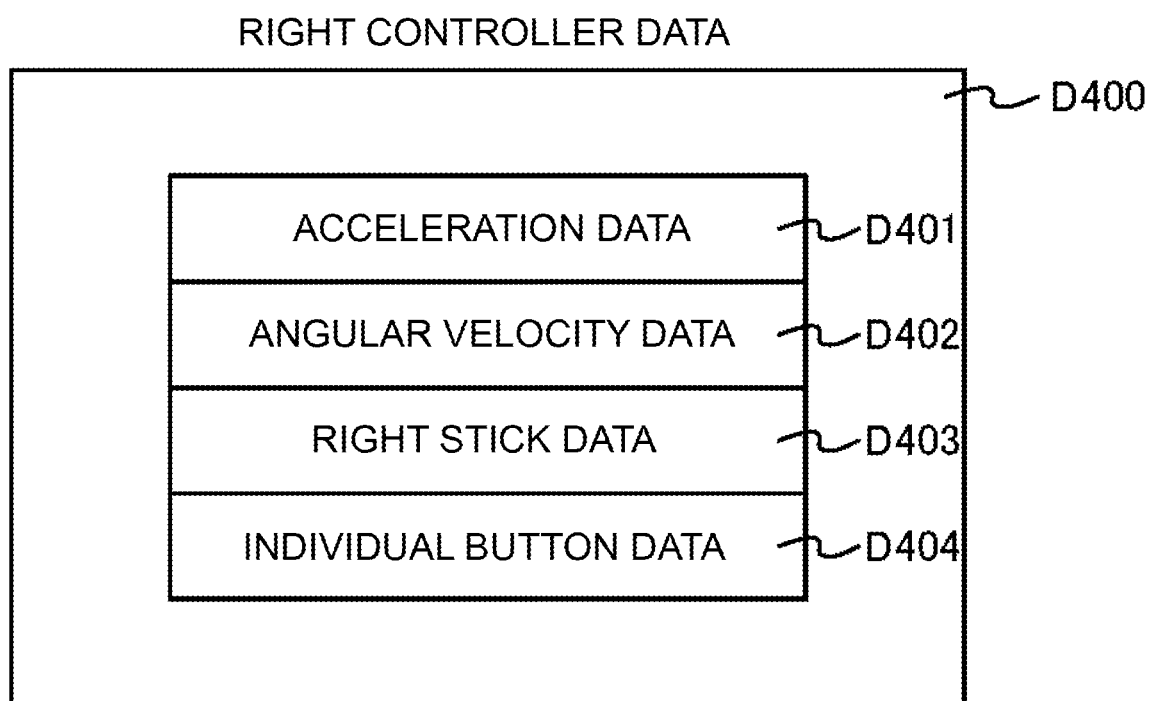
FIG. 10 is a diagram illustrating exemplary operation data output from the right controller.

Next, operation data output from each of controllers will be described. Operation data output from these controllers is obtained by the main body apparatus 2 and stored in a memory such as the DRAM 85. FIG. 9 is a diagram illustrating exemplary operation data output from the left controller 3. FIG. 10 is a diagram illustrating exemplary operation data output from the right controller 4.

As illustrated in FIG. 9, operation data D300 output from the left controller 3 includes acceleration data D301, angular velocity data D302, left stick data D303, and individual button data D304. The operation data D300 illustrated in FIG. 9 is output from the left controller 3 to the main body apparatus 2 at predetermined time intervals (for example, at ½₀₀ second intervals). Note that the operation data D300 illustrated in FIG. 9 is output to the main body apparatus 2 in a case where the left controller 3 is configured as the mobile apparatus controller 100 or as a wireless controller 300.

The acceleration data D301 is data indicating the value of the acceleration detected by the acceleration sensor 104. The angular velocity data D302 is data indicating the value of the angular velocity detected by the angular velocity sensor 105.

The left stick data D303 is data corresponding to operation onto the analog stick 32 and includes data indicating a direction corresponding to the inclination direction of the stick member and data indicating an inclination amount of the stick member. Moreover, as described above, the analog stick 32 is an input unit that can also perform pressing input onto the stick member. The left stick data D303 also includes data indicating whether the pressing input has been performed onto the analog stick 32.

The individual button data D304 includes data (data indicating ON or OFF) indicating whether operation onto individual buttons of the left controller 3 has been performed. For example, the individual button data 304 includes data indicating whether the operation buttons 33 to 36 are pressed, data indicating whether the recording button 37 is pressed, data indicating whether the first L button 38 is pressed, data indicating whether the ZL button 39 is pressed, and data indicating whether the –button 47 is pressed.

As illustrated in FIG. 10, operation data D400 output from the right controller 4 includes acceleration data D401, angular velocity data D402, right stick data D403, and individual button data D404. The operation data D400 illustrated in FIG. 10 is output from the right controller 4 to the main body apparatus 2 at predetermined time intervals (for example, at ½₀₀ second intervals). Note that the operation data D400 illustrated in FIG. 10 is output to the main body apparatus 2 in both cases where the right controller 4 is configured as the mobile apparatus controller 100 and as a wireless controller 300.

The acceleration data D401 is data indicating the value of the acceleration detected by the acceleration sensor 114. The angular velocity data D402 is data indicating a value of the angular velocity detected by the angular velocity sensor 115.

The right stick data D403 is data corresponding to operation onto the analog stick 52, and includes data indicating a direction corresponding to the inclination direction of the stick member and data indicating the inclination amount of the stick member. Moreover, as described above, the analog stick 52 is the input unit capable of performing pressing input onto the stick member. The right stick data D403 also includes data indicating whether the pressing input has been performed onto the analog stick 52.

The individual button data D404 includes data (data indicating ON or OFF) indicating whether operation onto individual buttons of the right controller 4 has been performed. For example, the individual button data D404 includes data indicating whether the operation buttons 53 to 56 are pressed, data indicating whether the home button 58 is pressed, data indicating whether the first R button 60 is pressed, data indicating whether the ZR button 61 is pressed, and data indicating whether the + button 57 is pressed.

(Game Processing Based on Operation Data)

Figure 11:
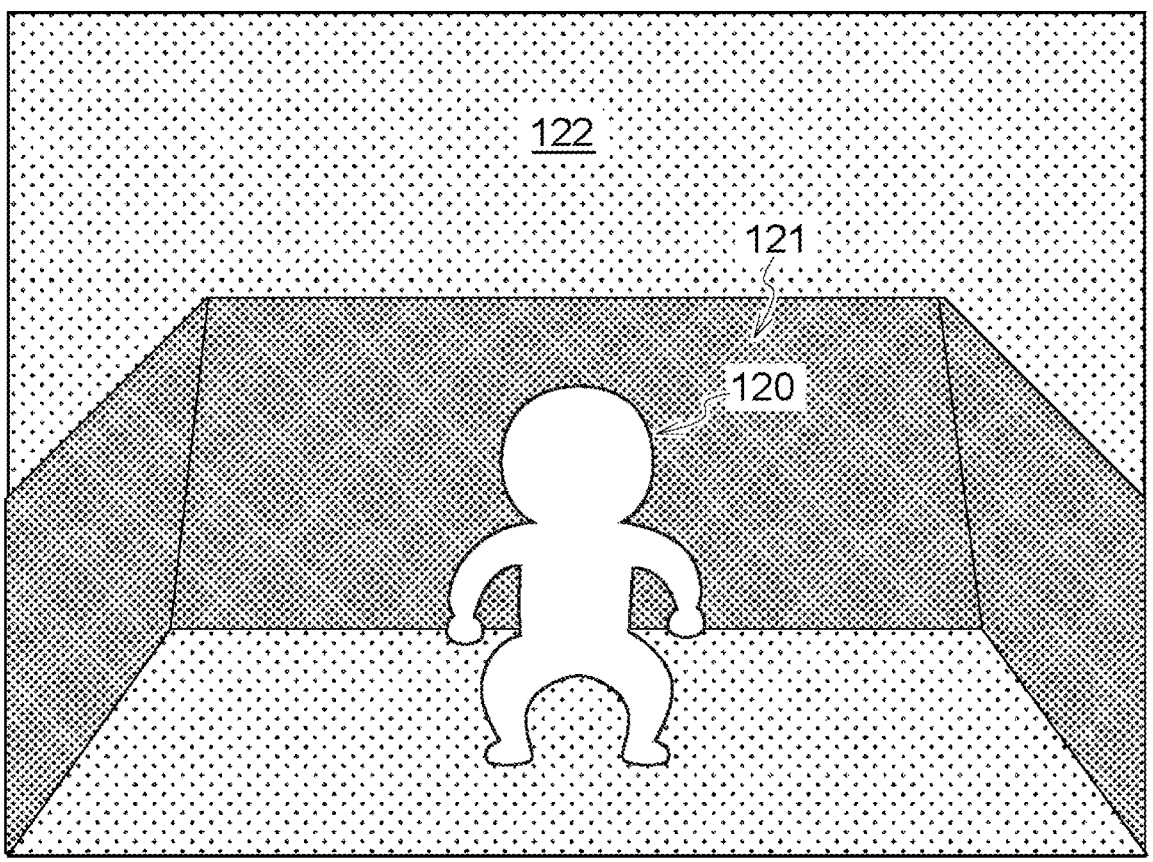
FIG. 11 is a diagram illustrating an exemplary screen of a game in the present embodiment.

Hereinafter, the game control of the present embodiment will be described. FIG. 11 illustrates a situation in which a wall 121 exists in front of a player character 120 at the time of moving in a virtual space and the player character 120 cannot move forward unless proceeding onto a flat land 122 above the wall 121. The wall 121 is an obstacle object that hinders the progress of the player character 120. FIG. 11 illustrates an example in which the wall 121 and the flat land 122 are similar in the color, brightness, and texture, making it difficult to visually recognize the presence of the wall 121 immediately. The difference in hue between the wall 121 and the flat land 122 is, for example, 60 degrees or less in the color circle. In a case where it is difficult to find that the progress of the player character 120 is hindered without careful observation of the screen in this manner, the game system 1 according to the present embodiment can clearly notify the user of the state of the game. Specifically, when the player character 120 is about to proceed toward the wall 121, the game system 1 according to the present embodiment causes a vibration actuator of the controller to vibrate, allowing the user to be informed of the situation. Furthermore, in the present embodiment, by changing the intensity of vibration in accordance with the direction in which the player character 120 is traveling and the angle formed with the wall 121, it is possible to give notice of the situation in more detail.

Figure 12:
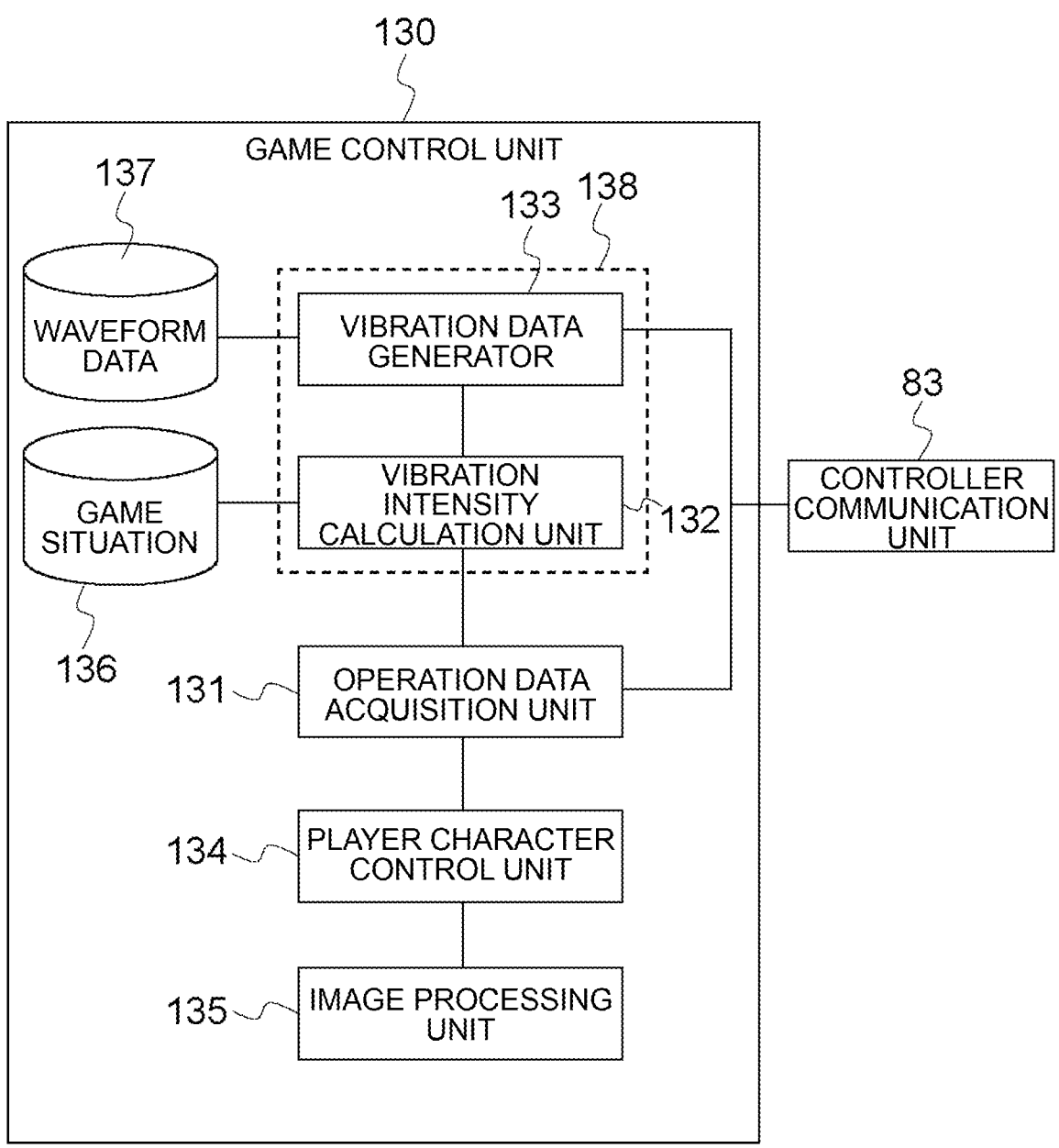
FIG. 12 is a diagram illustrating a game control unit configured to execute processing of a game system according to the present embodiment.

FIG. 12 is a diagram illustrating a game control unit 130 configured to execute processing of the game system 1 of the present embodiment. The game control unit 130 is realized by execution by the CPU 81 of the program stored in the flash memory 84. Note that while FIG. 12 illustrates solely the configuration necessary for the game control described in the present embodiment, the game control unit 130 includes, in practice, functions for performing control corresponding to the content of the game.

The game control unit 130 includes an operation data acquisition unit 131, a vibration intensity calculation unit 132, a vibration data generator 133, a player character control unit 134, and an image processing unit 135. The operation data acquisition unit 131 obtains the operation data D300 and D400 of the left controller 3 and the right controller 4 via the controller communication unit 83 and passes the obtained operation data to the vibration intensity calculation unit 132 and the player character control unit 134. In a case where the left controller 3 and the right controller 4 are attached to the main body apparatus 2, the operation data D300 and D400 are obtained via the left side terminal 17 and the right side terminal 21.

The vibration intensity calculation unit 132 includes a function of calculating the intensity of vibration generated on the controllers 3 and 4 when the player character 120 collides with the obstacle object or when coming in contact with and pushing the obstacle object. The intensity of vibration is set to an intensity according to the virtual acceleration at which the player character 120 is traveling toward the obstacle object. Here, "virtual acceleration" is acceleration calculated to be generated in the player character 120 in a case where there is no obstacle object, although in reality the player character 120 has difficulty in moving freely blocked by the obstacle object.

The vibration intensity calculation unit 132 is connected to a game situation data storage unit 136 that stores data related to the game situation. Data related to the game situation is data necessary for causing the game to proceed, and includes, for example, the current position, the traveling direction, the traveling speed of the player character 120 in the virtual space and the presence of an object existing around the player character 120 (obstacle object, enemy character object, etc.), physical power, ability, or the like, of the player character 120.

From the game situation data storage unit 136, the vibration intensity calculation unit 132 reads the current position, the traveling direction, the traveling speed of the player character 120 and the data of the obstacle object around the player, as the game situation data. The vibration intensity calculation unit 132 determines whether the player character 120 collides with the obstacle object or is in contact with the obstacle object and calculates the intensity of vibration to be given to the controllers 3 and 4 when the player character 120 is in collision or contact. First, with reference to FIG. 13, the intensity of vibration at the time of contact will be described.

Figure 13A:
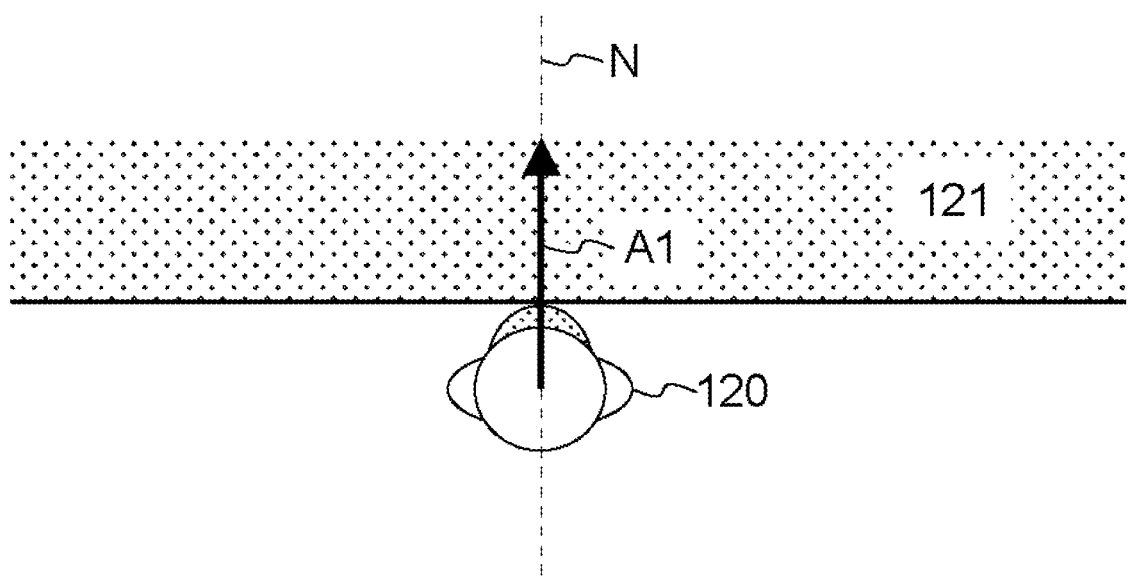
FIG. 13A is a diagram illustrating a traveling direction of a player character with respect to a wall (obstacle object) and virtual acceleration.
Figure 13B:
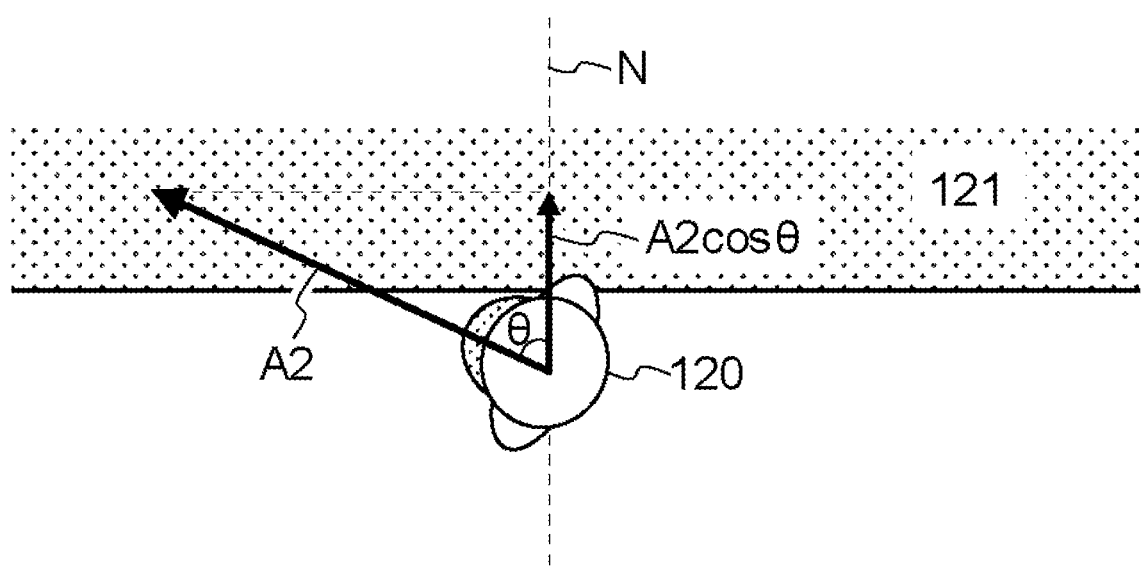
FIG. 13B is a diagram illustrating a traveling direction of the player character with respect to a wall (obstacle object) and virtual acceleration.

FIGS. 13A and 13B are diagrams illustrating a traveling direction of the player character 120 with respect to the wall (obstacle object) 121 and virtual acceleration. In FIG. 13A and FIG. 13B, the dotted line illustrates the normal of the wall 121 (obstacle object). While the wall 121 is drawn as a plane in FIGS. 13A and 13B, it would be sufficient, in a case where the wall 121 is uneven, to specify the normal of a microscopic plane of the wall 121 at a position where the character object is in contact. In a case where the wall 121 is defined by a polygon, the normal of the wall 121 is defined by the normal of the polygon coming in contact with the character object 120. In a case where the degree of unevenness of the wall 121 is small, a virtual plane may be defined regardless of unevenness of the wall 121 as an image.

In the example illustrated in FIG. 13A, the player character 120 is going to travel vertically toward the wall 121 at acceleration A1. This means while the player character 120 does not move because of the presence of the wall 121 in practice, the player character 120 moves at the acceleration A1 in a case where there is no wall 121. In the example illustrated in FIG. 13A, since the angle of the traveling direction of the player character 120 with respect to the normal of the wall 121 is 0°, the vibration intensity calculation unit 132 determines the intensity of vibration corresponding to the acceleration A1 on the assumption that the wall 121 is pressed with a force corresponding to the acceleration A1.

While various variations are allowable for the intensity of vibration, specifically, the vibration intensity calculation unit 132 may set the intensity of vibration to be proportional to the acceleration A1, or may be proportional to the square or an exponentially increased value of the acceleration A1, in the present embodiment, the intensity of vibration is set to be proportional to the square of the acceleration A1. It can be considered that the sense of being in contact with the wall 121 can be given by increasing the amount of increase of the vibration when the acceleration increases, while the amount of increases of the vibration is small when the acceleration is small.

In the example illustrated in FIG. 13B, the player character 120 is about to proceed toward the wall 121 leftward diagonally at acceleration A2. The traveling direction of the player character 120 with respect to the normal of the wall 121 is θ. In this case, the vibration intensity calculation unit 132 determines the intensity of vibration corresponding to A2 cos θ on the assumption that the player character 120 is pressing the wall 121 with a force corresponding to A2 cos θ. In the example illustrated in FIG. 13B, since the acceleration A2 has a component of A2 sin θ in a direction parallel to the wall 121 (perpendicular to the normal), the player character 120 moves along the wall 121 at acceleration of A2 sin θ. In the example illustrated in FIG. 13B, the player character 120 moves while rubbing the wall 121, and the user feels the vibration generated in the controllers 3 and 4, and can realize the feeling of rubbing the wall 121.

Up to this point, the intensity of vibration at the time when the player character 120 comes in contact with the wall 121 and is going toward the wall 121 has been described. The vibration intensity calculation unit 132, however, also calculates the intensity of vibration at the time of collision of the player character 120 with the wall 121. The vibration intensity calculation unit 132 calculates the intensity of vibration in accordance with a speed V of the player character 120 immediately before the player character 120 collides with the wall 121. Here again, the setting is such that the smaller the angle of the traveling direction of the player character 120 with respect to the normal of the wall 121, the greater the intensity of vibration, and that the greater the angle in the traveling direction with respect to the normal, the smaller the intensity of vibration. Specifically, similarly to the example illustrated in FIG. 13B, in a case where the angle is θ, a speed component in the normal direction of the speed V is obtained by multiplying the speed V by cos θ and the intensity of vibration proportional to the square of the speed V is determined. Again, the relationship between the speed V and the intensity of vibration can be changed in various manners as in the case of contact.

Next, the vibration data generator 133 will be described. The vibration data generator 133 has a function of generating vibration data in accordance with the intensity of vibration calculated by the vibration intensity calculation unit 132. The generated vibration data is transmitted from the controller communication unit to the controller. When generating the vibration data, the frequency and the amplitude may be obtained by calculation, or the vibration data may be generated on the basis of the waveform of a pattern stored beforehand. In the present embodiment, the vibration data generator 133 reads waveform data stored in the waveform data storage unit 137, and generates vibration data by changing the amplitude of the waveform data in accordance with the intensity of vibration.

Figure 14A:
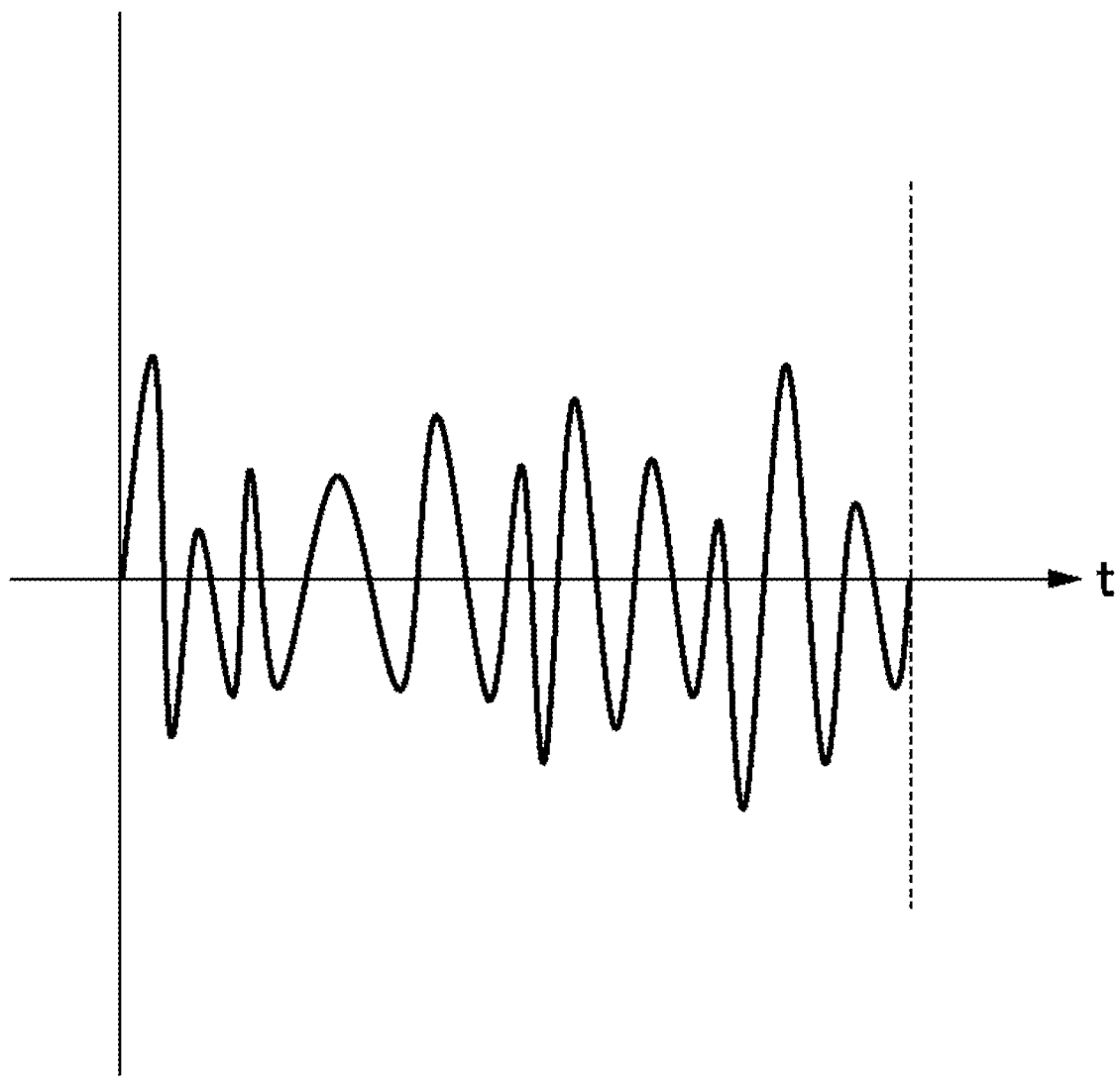
FIG. 14A is exemplary waveform data stored in a waveform data storage unit, illustrating a waveform as a base of vibration data of the time when the player character is in contact with the obstacle object.
Figure 14B:
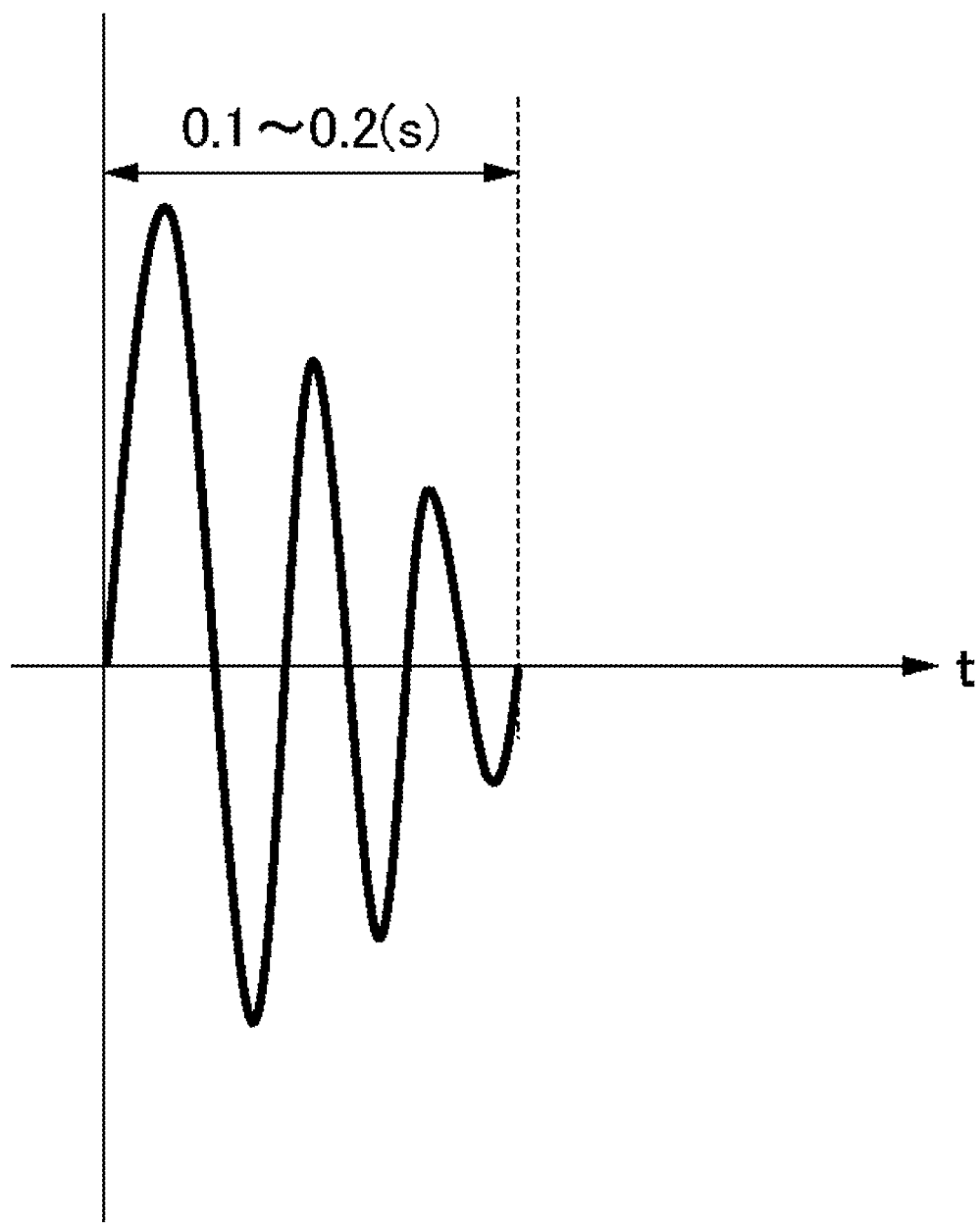
FIG. 14B is exemplary waveform data stored in the waveform data storage unit, illustrating a waveform as a base of vibration data of the time when the player character collides with the obstacle object.

FIGS. 14A and 14B are diagrams illustrating examples of waveform data stored in the waveform data storage unit 137. FIG. 14A is a diagram illustrating a waveform as the basis of the vibration data when the player character 120 is in contact with the obstacle object. The waveform used when the player character 120 is in contact with the obstacle object is a waveform having continuous vibration. The vibration data generator 133 generates vibration data by repeatedly using this waveform. At this time, the amplitude of the read waveform is changed on the basis of the intensity determined by the vibration intensity calculation unit 132. When the data output from the controller communication unit 83 is data indicating the amplitude and frequency per unit time, a portion of the waveform corresponding to the timing of output is converted into information indicating frequency and amplitude and is output.

FIG. 14B is a diagram illustrating a waveform as the basis of the vibration data when the player character 120 collides with the obstacle object. This waveform data is data of vibration that initially has high intensity, attenuates in 0.1 to 0.2 seconds, and becomes zero. The waveform used when colliding with the obstacle object is larger in amplitude than the waveform used when being in contact with the obstacle object. In a case where the character object collides with the obstacle object and attempts to proceed toward the obstacle object from that state, the vibration intensity calculation unit 132 and the vibration data generator 133 sequentially generate vibration data, resulting in generating a large vibration first and thereafter, a continuation of small vibrations. Note that a configuration 138 including the vibration intensity calculation unit 132 and the vibration data generator 133 described above corresponds to the "vibration control unit" that controls the vibration of the vibration actuators 107 and 117 by the vibration data.

The player character control unit 134 determines the behavior of the player character 120 on the basis of the operation data obtained by the operation data acquisition unit 131. The player character 120 is moved within the virtual space on the basis of the left controller data D300 and the right controller data D400, and the movement of the player is restricted in a case where there is an obstacle object in the moving direction.

The image processing unit 135 has a function of generating an image of a virtual space including the player character 120 determined by the player character control unit 134 and displaying the image on the display 12.

FIG. 15 is a flowchart illustrating processing of the main body apparatus according to the present embodiment. The main body apparatus 2 realizes game processing by executing the flowchart illustrated in FIG. 15 at a predetermined time interval (for example, ¹⁄₆₀ seconds).

The operation data acquisition unit 131 of the main body apparatus 2 obtains operation data from a buffer that stores the operation data transmitted from the left controller 3 and the right controller 4 (S10), and passes the obtained operation data to the vibration intensity calculation unit 132 and the player character control unit 134. The vibration intensity calculation unit 132 reads game situation data from the game situation data storage unit 136 (S12) and grasps the current position, the traveling direction, the moving speed of the player character 120 and objects around the player character 120.

The vibration intensity calculation unit 132 calculates the speed and moving direction of the player character 120 on the basis of the operation data passed from the operation data acquisition unit 131 and on the basis of the current traveling direction and moving speed (S14). The vibration intensity calculation unit 132 determines whether the player character 120 collides with or comes in contact with the obstacle object (S16). In a case where it is determined as a result of this determination that the player character 120 and the obstacle object have no collision or contact with each other (NO in S16), the control related to the vibration data is skipped and control transitions to the control of the player character 120 (S22).

In a case where it is determined as a result of this determination that the player character 120 and the obstacle object collide or come in contact with each other (YES in S16), the intensity of vibration is calculated. In a case where it is determined that the player character 120 collides with the obstacle object, the intensity of vibration is calculated on the basis of the moving speed with respect to the normal direction of the obstacle object immediately before the player character 120 collides with the obstacle object. In a case where it is determined that the player character 120 is in contact with the obstacle object, the intensity of vibration is calculated on the basis of the acceleration with respect to the normal direction of the obstacle object of the player character 120 for a case where there is no obstacle object (refer to FIGS. 13A and 13B).

The vibration intensity calculation unit 132 passes a calculation result to the vibration data generator 133, and the vibration data generator 133 generates vibration data on the basis of the calculated intensity of vibration. As described above, when the player character 120 is in contact with the obstacle object, the vibration data is generated using the waveform data illustrated in FIG. 14A, and when the player character 120 collides with the obstacle object, the vibration data is generated using the waveform data illustrated in FIG. 14B. Note that since the flowchart illustrated in FIG. 15 is executed at a predetermined time interval (for example, ¹⁄₆₀ seconds), a determination result of either collision or contact is obtained for one loop, and the intensity of vibration is calculated and vibration data is generated, for the loop. By repeating the loop illustrated in FIG. 15, continuous vibration occurs in the controllers 3 and 4.

The vibration data generator 133 outputs the generated vibration data to a transmission buffer for transmission to the left controller 3 and the right controller 4. The vibration data input into the transmission buffer is read at a predetermined timing and transmitted to the left controller 3 and the right controller 4 via the controller communication unit 83.

Meanwhile, the player character control unit 134 performs player character control of determining animation to be performed by the player character 120 on the basis of the input operation data (S22). Subsequently, image processing of the virtual space including the player character 120 is performed (S24) on the basis of the determined control, thereby displaying the image on the display 12. The game system 1 and the game control method of the present embodiment have been described above.

According to the game system 1 of the present embodiment, feedback by vibration is performed when the player character 120 collides with or comes in contact with the obstacle object such as the wall 121, allowing the user to easily grasp the fact that the player character 120 collides or comes in contact with the obstacle object. In addition, since the intensity of vibration changes with the angle of the player character 120 with respect to the obstacle object, it is possible to clearly provide information on the direction of the obstacle object. This is particularly effective when visual recognition of the obstacle object is difficult.

In the above embodiment, the vibration intensity calculation unit 132 calculates the intensity of vibration on the basis of the virtual acceleration of the player character 120 when the player character 120 is in contact with the obstacle object. Alternatively, the intensity of vibration may be calculated on the basis of the virtual speed of the player character 120 instead of the acceleration of the player character 120. The virtual speed can be obtained by integrating the virtual acceleration. Moreover, the above-described example is the case where the vibration intensity calculation unit 132 calculates the intensity of vibration on the basis of the speed of the player character 120 immediately before the collision when the player character collides with the obstacle object. Alternatively, the intensity of vibration may be calculated on the basis of the acceleration of the player character 120 instead of the speed of the player character 120 immediately before the collision.

In the above-described embodiment, when the player character 120 is in contact with the obstacle object, the vibration intensity calculation unit 132 determines the intensity of vibration in consideration of the angle θ formed by the traveling direction of the player character 120 with respect to the normal of the obstacle object. Alternatively, the intensity of vibration may be calculated on the basis of the virtual acceleration alone without using the angle θ. Conversely, instead of considering the virtual acceleration, the intensity of vibration may be determined on the basis of solely the angle θ formed by the traveling direction of the player character 120 with respect to the normal of the obstacle object. In a similar manner, when the player character 120 collides with the obstacle object, the intensity of vibration may be determined on the basis of solely the speed of the player character 120 immediately before the collision or solely the angle.

In the above-described embodiment, a plurality of types of waveform data may be stored in the waveform data storage unit 137, and waveform data to be used may be changed in accordance with the nature of material of the obstacle object, or the like. Here, examples of the nature of material include being rough like the rock 121, or being slippery like a glass window. By changing the waveform data according to the nature of material in this manner, it is possible to enhance the reality of the game by bringing the sense of collision or contact with the wall 121 closer to reality.

Moreover, in the above embodiment, for example, as illustrated in FIG. 13B, it is possible to configure such that, in a case where the player character 120 moves while being in contact with the wall 121, the controller on the side where the player character 120 is in contact with the wall 120 (right controller 4 in the example illustrated in 13B) is caused to generate vibration and the controller on the side not in contact is not caused to vibrate. This configuration allows the user to easily judge which side of the player character 120 is in contact with the wall.

We claim:

1. A game system comprising:
a controller;
a vibrator configured to vibrate with a specified intensity and;
at least one processor configured to:
enable a player character to move within a virtual space based on operation of the controller; and
detect a contact between the player character and an uninvadable obstacle object, and cause the vibrator to vibrate with an intensity varying based on a traveling direction of the player character with respect to the obstacle object in a case where the operation of the controller directs the player character toward the obstacle object while the contact is continued.

2. The game system according to claim 1, wherein the intensity of vibration is set such that the smaller the angle between the direction in which the player character is traveling and a normal of the obstacle object at a position where the player character comes in contact with the obstacle object, the higher the intensity of vibration.

3. The game system according to claim 2, wherein the intensity of vibration is set based on a moving speed or acceleration of the player character calculated based on the operation of the controller assuming that there is no obstacle object, and based on the angle formed by the traveling direction of the player character and the normal of the obstacle object.

4. The game system according to claim 1, wherein the intensity of vibration is set based on a speed or acceleration of the player character immediately before the player character comes in contact with the obstacle object.

5. The game system according to claim 4, wherein the intensity of vibration is set based on a speed or acceleration of the player character and an angle formed by a traveling direction of the player character and a normal of the obstacle object.

6. The game system according to claim 1, wherein the obstacle object is a terrain object within the virtual space.

7. A game system comprising:
a controller;
a vibrator configured to vibrate with a specified intensity; and
at least one processor configured to:
enable a player character to move within a virtual space based on operation of the controller; and
detect a contact between the player character and an uninvadable obstacle object, and cause the vibrator to vibrate with a variable intensity corresponding to a moving speed or acceleration of the player character calculated based on the operation of the controller assuming that there is no obstacle object, in a case where the operation of the controller directs the player character toward the obstacle object as contact between the player character and an uninvadable obstacle object is maintained.

8. A non-transitory storage medium storing a game program for controlling a computer built in or connected to an apparatus including a controller and a vibrator configured to vibrate with a specified intensity, wherein the game program causes the computer to at least:
obtain operation data of an operation performed using the controller;
detect a contact between a player character and an uninvadable obstacle object and determine whether there is an operation directing the player character toward the obstacle object based on the operation data; and
generate vibration data for causing the vibrator to vibrate with an intensity varying based on a traveling direction of the player character with respect to the obstacle object in a case where it is determined that there has been an operation directing the player character toward the obstacle object while the contact is continued.

9. The non-transitory storage medium according to claim 8, wherein the generating of the vibration data generates the vibration data such that the smaller the angle between the direction in which the player character is traveling and a normal of the obstacle object at a position where the player character comes in contact with the obstacle object, the higher the intensity of vibration.

10. The non-transitory storage medium according to claim 9, wherein the generating of the vibration data generates the vibration data based on the moving speed or acceleration of the player character calculated based on the operation data assuming that there is no obstacle object, and based on the angle formed by the traveling direction of the player character and the normal of the obstacle object.

11. The non-transitory storage medium according to claim 8, wherein the generating of the vibration data generates the vibration data based on a speed or acceleration of the player character immediately before the player character comes in contact with the obstacle object.

12. The non-transitory storage medium according to claim 11, wherein the generating of the vibration data generates the vibration data based on a speed or acceleration of the player character and an angle formed by a traveling direction of the player character and a normal of the obstacle object.

13. The non-transitory storage medium according to claim 8, wherein the obstacle object is a terrain object within a virtual space.

14. A non-transitory storage medium storing a game program for controlling a computer built in or connected to an apparatus including a controller and a vibrator configured to vibrate with a specified intensity, wherein the game program causes the computer to at least:
obtain operation data of an operation performed using the controller;
detect a contact between a player character and an uninvadable obstacle object and determine whether there is an operation directing the player character toward the obstacle object based on the operation data; and
generate vibration data for causing the vibrator to vibrate with an intensity varying based on a moving speed or acceleration of the player character calculated based on the operation data assuming that there is no obstacle object, in a case where it is determined that there has been an operation directing the player character toward the obstacle object while the contact is continued.

15. An information processing apparatus built in or connected to an apparatus including a controller and a vibrator configured to vibrate at a specified intensity, the information processing apparatus comprising at least one processor configured to:
enable a player character to move within a virtual space based on operation of the controller; and
detect a contact between the player character and an uninvadable obstacle object, and cause the vibrator to vibrate with an intensity corresponding to based on a traveling direction of the player character with respect to the obstacle object in a case where the operation of the controller directs the player character toward the obstacle object while the contact is continued.

16. An information processing apparatus built in or connected to an apparatus including a controller and a vibrator configured to vibrate at a specified intensity, the information processing apparatus comprising at lease one processor configured to:
enable a player character to move within a virtual space based on operation of the controller; and
detect a contact between the player character and an uninvadable obstacle object, and cause the vibrator to vibrate with a variable intensity a moving speed or acceleration of the player character calculated based on the operation of the controller assuming that there is no obstacle object, in a case where the operation of the controller directs the player character toward the obstacle object as contact between the player character and an uninvadable obstacle object is maintained.

17. A game control method for controlling game processing by an information processing apparatus built in or connected to an apparatus including a controller and a vibrator configured to vibrate at a specified intensity, the method comprising:
obtaining, by the information processing apparatus, operation data of an operation performed using the controller;
detecting by the information processing apparatus, a contact between a player character and an uninvadable obstacle object and determining, by the information processing apparatus, whether there is an operation directing the player character toward the obstacle object based on the operation data; and
generating, by the information processing apparatus, vibration data for causing the vibrator to vibrate with an intensity varying based on a traveling direction of the player character with respect to the obstacle object in a case where it is determined that there has been an operation directing the player character toward the obstacle object while the contact is continued.

18. The method according to claim 17, wherein the vibration data is generated such that the smaller the angle between the direction in which the player character is traveling and a normal of the obstacle object at a position where the player character comes in contact with the obstacle object, the higher the intensity of vibration.

19. A game control method for controlling game processing by an information processing apparatus built in or connected to an apparatus including a controller and a vibrator configured to vibrate at a specified intensity, the method comprising:
obtaining, by the information processing apparatus, operation data of an operation performed using the controller;
detecting by the information processing apparatus, a contact between a player character and an uninvadable obstacle object and determining, by the information processing apparatus, whether there is an operation directing the player character toward the obstacle object based on the operation data; and
generating, by the information processing apparatus, vibration data for causing the vibrator to vibrate with a variable intensity corresponding to a moving speed or acceleration of the player character calculated based on the operation data assuming that there is no obstacle object, in a case where it is determined that there has been an operation directing the player character toward the obstacle object as contact between the player character and an uninvadable obstacle object is maintained.

20. The method according to claim 19, wherein the vibration data is generated so as to be proportional to the moving speed or acceleration of the player character during continuously detected contact with the obstacle object.

* * * * *